(12) United States Patent
Regan et al.

(10) Patent No.: US 9,283,583 B2
(45) Date of Patent: Mar. 15, 2016

(54) SYSTEM FOR SHOE SOLE PORTION PAINTING

(71) Applicant: NIKE, INC., Beaverton, OR (US)

(72) Inventors: Patrick Conall Regan, Taichung (TW); Feng-Ming Ou, Taichung (TW); Hao-Zhen Chen, Changhua (TW); Chih-Chung Wu, Changhua (TW)

(73) Assignee: NIKE, Inc., Beaverton, OR (US)

( * ) Notice: Subject to any disclaimer, the term of this patent is extended or adjusted under 35 U.S.C. 154(b) by 130 days.

(21) Appl. No.: 14/149,151

(22) Filed: Jan. 7, 2014

(65) Prior Publication Data

US 2015/0190830 A1    Jul. 9, 2015

(51) Int. Cl.

| B05C 5/02 | (2006.01) |
|---|---|
| B05B 12/02 | (2006.01) |
| B05B 13/02 | (2006.01) |
| B05C 13/02 | (2006.01) |
| A43D 95/06 | (2006.01) |
| A43D 95/14 | (2006.01) |
| A43B 3/00 | (2006.01) |
| A43B 13/00 | (2006.01) |
| A43D 8/42 | (2006.01) |
| B05C 21/00 | (2006.01) |

(52) U.S. Cl.
CPC ............. *B05B 12/02* (2013.01); *A43B 3/0078* (2013.01); *A43B 13/00* (2013.01); *A43D 8/42* (2013.01); *A43D 95/06* (2013.01); *A43D 95/14* (2013.01); *B05B 13/0221* (2013.01); *B05C 5/0204* (2013.01); *B05C 5/0208* (2013.01); *B05C 5/0212* (2013.01); *B05C 13/02* (2013.01); *B05C 21/005* (2013.01); *B05B 13/02* (2013.01); *B05C 21/00* (2013.01)

(58) Field of Classification Search
CPC   B29D 35/00; B29D 35/122; B29L 2031/504; A43D 37/00; A43D 25/00; B05C 5/0204; B05C 5/0208; B05C 5/0212; B05C 13/02; B05C 21/005; B05C 21/00
USPC ..... 118/696, 300, 324; 12/18.5, 142 R, 17 R, 12/DIG. 3, 123; 100/233, 234, 235
See application file for complete search history.

(56) References Cited

U.S. PATENT DOCUMENTS

| 3,274,628 A | 9/1966 | Ralphs |
|---|---|---|
| 3,282,247 A | 11/1966 | Ralphs |
| 4,639,963 A * | 2/1987 | Fisher .............................. 12/1 A |

(Continued)

FOREIGN PATENT DOCUMENTS

EP    0238424 A1    9/1987

OTHER PUBLICATIONS

Tienkang Company—http://www.tienkang.com.tw/tw/p-bubber-332.htm, last accessed Jan. 23, 2014.

(Continued)

*Primary Examiner* — Laura Edwards
(74) *Attorney, Agent, or Firm* — Shook, Hardy & Bacon L.L.P.

(57) ABSTRACT

An automated system for painting a shoe sole portion of a shoe is provided. The automated painting system is adapted to use a variety of stations and components to automatically paint a side surface of the shoe sole portion while it is secured in a jig, transition the jig to an open position, and remove the painted shoe sole portion from the jig.

18 Claims, 28 Drawing Sheets

(56) References Cited

U.S. PATENT DOCUMENTS 5,807,449 A * 9/1998 Hooker et al. .................. 156/64
2008/0175942 A1 * 7/2008 Chi-Jin ......................... 425/4 C

OTHER PUBLICATIONS

CTM Group—http://www.ctmgroup.com.tw/products/CT-807_Semi-Auto_Rubber_Sole_Moulding_Press_c.php, last accessed Jan. 23, 2014.

International Search Report with Written Opinion dated Feb. 25, 2015 in Application No. PCT/US2014/065490, 10 pages.
International Search Report with Written Opinion dated Feb. 20, 2015 in Application No. PCT/US2014/065493, 12 pages.
King Steel Company—http://www.kingsteel.com/english/02_Technology/01_detail.php?dpid=5, last accessed Oct. 2, 2015.
CT-807 Semi Auto Rubber Sole Moulding Press—C.T.M. Co., Ltd.—YouTube Video posted Apr. 29, 2013—https://www.youtube.com/watch?v=_ePX4RnK5bE, last accessed Jan. 23, 2014.

* cited by examiner

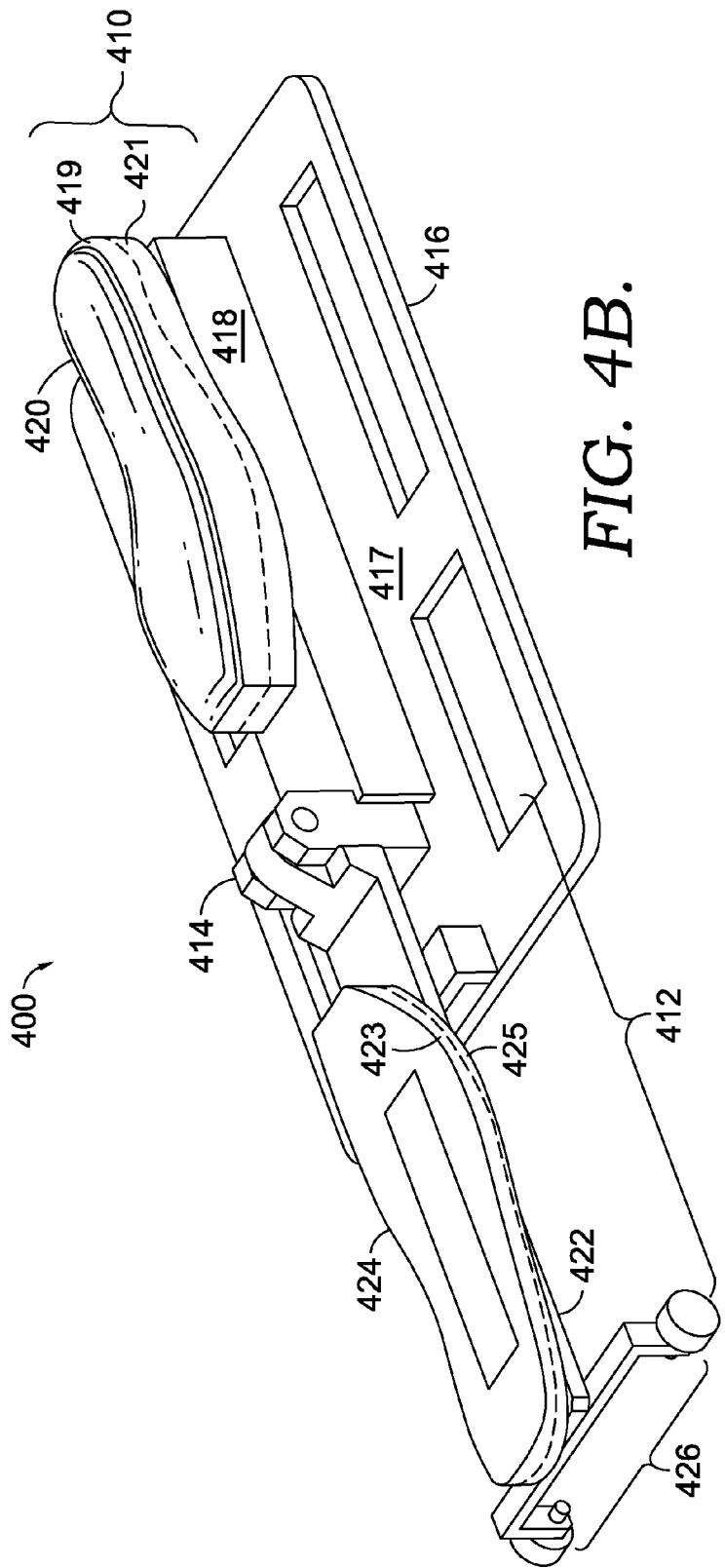

SYSTEM FOR SHOE SOLE PORTION PAINTING

CROSS-REFERENCE TO RELATED APPLICATIONS

This application, having Ser. No. 14/149,151 and entitled "SYSTEM FOR SHOE SOLE PORTION PAINTING" is related by subject matter to concurrently filed U.S. patent application Ser. No. 14/149,142, entitled "JIG FOR A SHOE SOLE PORTION," which is assigned or under obligation of assignment to the same entity as this application. The entirety of the aforementioned application is incorporated by reference herein.

STATEMENT REGARDING FEDERALLY SPONSORED RESEARCH OR DEVELOPMENT

Not applicable.

TECHNICAL FIELD

The aspects hereof relate to a jig for securing a shoe sole portion during an automated painting process. More particularly, aspects hereof relate to a jig having a bottom plate, and a top plate connected to the bottom plate. Both the bottom plate and the top plate comprise a multi-layer deforming layer and a rigid layer. The shoe sole portion is secured between the two deforming layers when the jig is in a closed position such that a side surface of the shoe sole portion is left exposed for painting.

The aspects hereof also relate to a system for painting a shoe sole portion. More particularly, the aspects relate to a jig for securing the shoe sole portion such that a side surface of the shoe sole portion is exposed and a painting station that automatically paints the exposed side surface of the shoe sole portion while it is secured in the jig.

BACKGROUND

Painting a shoe sole portion has traditionally been a labor-intensive process that requires a human operator to manually tape or mask all the areas of the shoe sole portion that are not to be painted. The human operator then manually paints any portions of the shoe sole portion that are left exposed. Replacing the manual painting process with an automated painting system has been challenging not only due to the difficulty in constructing a universal jig that is able to secure the shoe sole portion in such a way that only a paintable surface is left exposed but also due to difficulties in constructing the jig so that it is able to secure a wide variety of styles and sizes of shoe sole portions. Additionally, it has been challenging to automate the opening of the jig after the shoe sole portion has been painted and to automate the removal of the painted shoe sole portion from the open jig.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects generally relate to a jig used to secure a shoe sole portion during an automated painting process. The jig comprises a bottom plate having a first multi-layer deforming layer and a first rigid layer, and a top plate pivotably coupled to the bottom plate. The top plate comprises a second multi-layer deforming layer and a second rigid layer. The shoe sole portion is secured between the deforming layers of the top plate and the bottom plate when the multi-layer jig is in a closed position such that a side surface of the shoe sole portion is left exposed.

Aspects also generally relate to a shoe sole painting system that comprises at least a jig used to secure a shoe sole portion such that a side surface of the shoe sole portion is left exposed and a painting station that automatically paints the exposed side surface of the shoe sole portion while the shoe sole portion is secured by the jig.

BRIEF DESCRIPTION OF THE SEVERAL VIEWS OF THE DRAWINGS

The present invention is described in detail below with reference to the attached drawing figures, wherein:

FIG. 4B depicts an exemplary side perspective view of the jig of FIG. 4A and illustrates a variable line of demarcation between inner and outer deforming sub-layers in accordance with aspects hereof.

DETAILED DESCRIPTION

Figure 1:
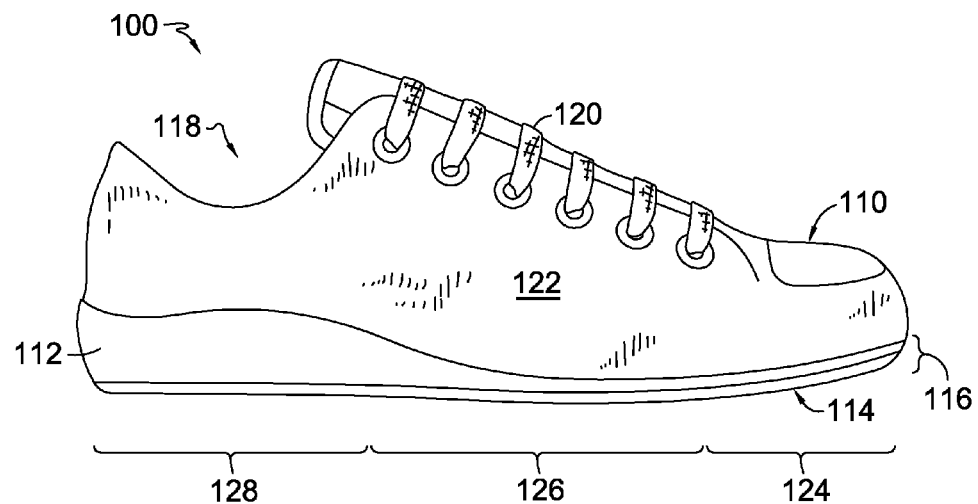
FIG. 1 illustrates a side view of an exemplary shoe for reference purposes in accordance with aspects hereof.

Aspects provide a jig for securing a shoe sole portion during an automated painting process and a method of using the jig to secure the shoe sole portion. The jig in accordance with aspects hereof may comprise at least a bottom plate having two layers and a top plate having two layers. The first layer of the bottom plate may comprise a rigid layer that may be formed from a variety of generally non-deforming materials such as metal, ceramic, and the like. The second layer of the bottom plate may comprise a deforming layer composed of multiple sub-layers (hereinafter known as a "multi-layer deforming layer") where each sub-layer may have a different degree of deformability.

The multi-layer deforming layer may be constructed from a variety of materials such as thermoplastic polyurethane (TPU), cast polyurethane (cast PU), rubber, silicone, and the like that are elastically deformable upon the application of pressure and return to their original shape when the pressure is removed. The multi-layer deforming layer of the bottom plate may be constructed in such a way as to impart a deformability gradient (e.g., transition or graduation) from, for example, an outer sub-layer of the deforming layer (e.g., the sub-layer in contact with the rigid layer) to an inner sub-layer of the deforming layer such that the inner sub-layer of the deforming layer is softer or more deformable than the outer sub-layer of the deforming layer. The multi-layer deforming layer of the bottom plate may be releasably secured to the rigid layer. As such, the multi-layer deforming layer of the bottom plate may be removed and exchanged for another multi-layer deforming layer having similar deforming properties but of a different size and/or configuration to accommodate differing styles and sizes of shoe sole portions.

The top plate of the jig is connected to the bottom plate via, for example, a pivotable-type connection such that the top plate can be rotated about the pivotable connection to open and close the jig. The first layer of the top plate may comprise a rigid or non-deforming layer constructed of materials such as metal, ceramic, and the like. The second layer of the top plate is releasably secured to the rigid layer and may comprise a deforming layer having multiple sub-layers constructed of materials such as TPU, cast PU, silicone, and/or rubber that are capable of elastic deformation upon application of pressure. The multi-layer deforming layer of the top plate may be constructed in such a way as to impart a deformability gradient from, for example, an outer sub-layer of the deforming layer (e.g., the sub-layer in contact with the rigid layer) to an inner sub-layer of the deforming layer such that the inner sub-layer is softer or more deformable than the outer sub-layer. As used herein, a "gradient" is a change in a property, which may not change linearly or consistently. When the jig is in the closed position, the multi-layer deforming layer of the top plate is positionable proximate to the multi-layer deforming layer of the bottom plate. The multi-layer deforming layer of the top plate may be removed and exchanged for another multi-layer deforming layer having similar deforming properties but of a different size and/or configuration to accommodate differing styles and sizes of shoe sole portions. The top plate may also comprise an open-assist mechanism attached to the rigid layer of the top plate opposite the pivotable connection. The open-assist mechanism may be used in transitioning the jig from a closed position to an open position.

The use of deforming layers having multiple sub-layers where each sub-layer may have a differing degree of deformation is useful to provide a greater amount of control over the deformation of the multi-layer deforming layers when pressure is applied to, for example, the top plate of the jig when the jig is in a closed position. By altering the deforming properties of the individual sub-layers, and/or by modifying the thickness of one or more of the sub-layers, the deformation process can be controlled to achieve a specific purpose. For example, the characteristics of the sub-layers may be altered to produce configurable masking lines along portions of the side surface of a shoe sole portion while it is secured in the jig.

The method of using the jig in accordance with aspects provided herein may comprise positioning the jig in an open position and, while the jig is in the open position, positioning an upper surface of a shoe sole portion on the deforming layer of the bottom plate. The top plate of the jig may then be rotated towards the bottom plate via the pivotable connection to transition the jig to a closed position. When the jig is in the closed position, the deforming layer of the top plate of the jig may be adjacent to a lower surface of the shoe sole portion.

Aspects may additionally provide for a shoe sole portion painting system for painting a shoe sole portion. The shoe sole portion painting system in accordance with aspects hereof may comprise a jig for securing a shoe sole portion such that, in an exemplary aspect, only a side surface of the shoe sole portion is exposed when the jig is in a closed position. The painting system may further comprise a painting station that automatically paints the exposed side surface of the shoe sole portion while it is secured in the jig. Additionally, the painting system may comprise an opening station that is adapted to translate longitudinal movement of the jig into an opening force that transitions the jig from the closed position to a fully-open position, and an unloading station that automatically removes the painted shoe sole portion from the jig and positions the painted shoe sole portion in an upright position. The shoe sole portion painting system may also comprise a transport assembly that transports the jig at least from a first location, such as a loading station, to the painting station, from the painting station to the opening station, and from the opening station to the unloading station.

FIG. 1 depicts an exemplary shoe 100 that will be described for reference purposes. The shoe 100 comprises an upper 110 and a sole structure 116. The sole structure, in turn, comprises a midsole 112 and an outsole 114. While a separate midsole 112 and outsole 114 are discussed herein, it is contemplated that the sole structure 116 may be formed such that the midsole 112 and the outsole 114 are merely regions of a commonly formed structure. For reference purposes, the shoe 100 may be divided into three general regions or areas: a forefoot or toe region 124, a midfoot region 126, and a heel region 128. The shoe 100 also comprises a lateral side 122 and a medial side (not shown). The lateral side 122 extends along a lateral side of a user's foot and generally comprises the regions 124, 126, and 128. The medial side extends along a medial side of the user's foot and also comprises the regions 124, 126, and 128. The lateral side 122, the medial side, and the regions 124, 126, and 128 are not intended to demarcate specific areas of the shoe 100. Instead, they are intended to represent general areas of the shoe 100 and are used for reference purposes for the following discussion. For example, the medial side and the lateral side 122 may converge near the toe region 124 at respective sides of a toe box. Similarly, it is contemplated that the medial side and the lateral side 122 may also converge at respective sides of an Achilles reinforcement proximate the heel region 128. Therefore, depending on the shoe design and construction, the terms medial, lateral, toe, heel, and the like generally refer to a proximate location and may not be limiting.

The upper 110 is generally secured to the sole structure 116 and defines a cavity for receiving a foot. As mentioned above, the sole structure 116 may comprise the outsole 114 and the midsole 112. The outsole 114 forms a ground-engaging surface of the sole structure 116, and the midsole 112 is generally positioned between the upper 110 and the outsole 114. The outsole 114 and/or the midsole 112 may be formed of conventional materials such as rubber, leather, or a polymer foam material (polyurethane or ethylene vinyl acetate for example). The outsole 114 may be integrally formed with the midsole 112, or the outsole 114 may be attached to a lower surface of the midsole 112. Further, it is contemplated that the midsole 112 may be inserted into a cavity within the outsole 114.

Figure 2:
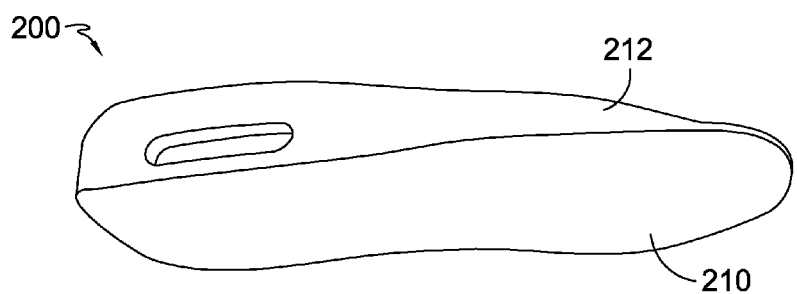
FIG. 2 illustrates a bottom perspective view of an exemplary shoe sole portion for reference purposes in accordance with aspects hereof.

FIG. 2 depicts an exemplary perspective view of a lower surface 210 of a shoe sole portion 200. As used throughout, the term "shoe sole portion" is meant to encompass a midsole portion such as the midsole 112 of FIG. 1, a midsole portion integrally formed with an outsole portion such as the outsole 114 of FIG. 1, and/or an outsole portion without a midsole portion. The lower surface 210 of the shoe sole portion 200 may be adjacent to an outsole when the shoe sole portion comprises a midsole portion, or the lower surface 210 may comprise a ground engaging surface when the midsole is integrally formed with the outsole or when the shoe sole portion comprises an outsole. As shown in FIG. 2, the lower surface 210 of the shoe sole portion 200 is comparatively flat without significant concavities or convexities. The shoe sole portion 200 shown in FIG. 2 further comprises a side surface 212. In one aspect, the side surface 212 may comprise a medial side, a lateral side, a heel region, and a toe region. In another aspect, and as shown in FIG. 2, the medial and lateral sides of the shoe sole portion 200 may taper as they converge near the toe region such that the side surface 212 may diminish to a negligible thickness near the toe region. Any and all such aspects, and any combination thereof, are contemplated as being within the scope contemplated herein.

Figure 3:
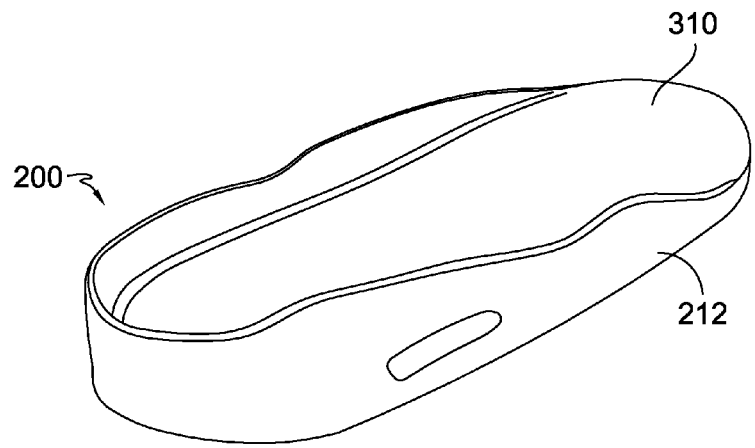
FIG. 3 illustrates a top perspective view of an exemplary shoe sole portion for reference purposes in accordance with aspects hereof.

FIG. 3 depicts an exemplary perspective view of an upper surface 310 of the shoe sole portion 200. The upper surface 310 of the shoe sole portion 200 may be adjacent to an upper, such as the upper 122 of FIG. 1, when the shoe is in an as-constructed arrangement. As shown in FIG. 3, the side surface 212 in combination with the upper surface 310 form at least a partial concavity into which a wearer's foot may partially reside when the shoe is in an as-constructed arrangement.

Figure 4A:
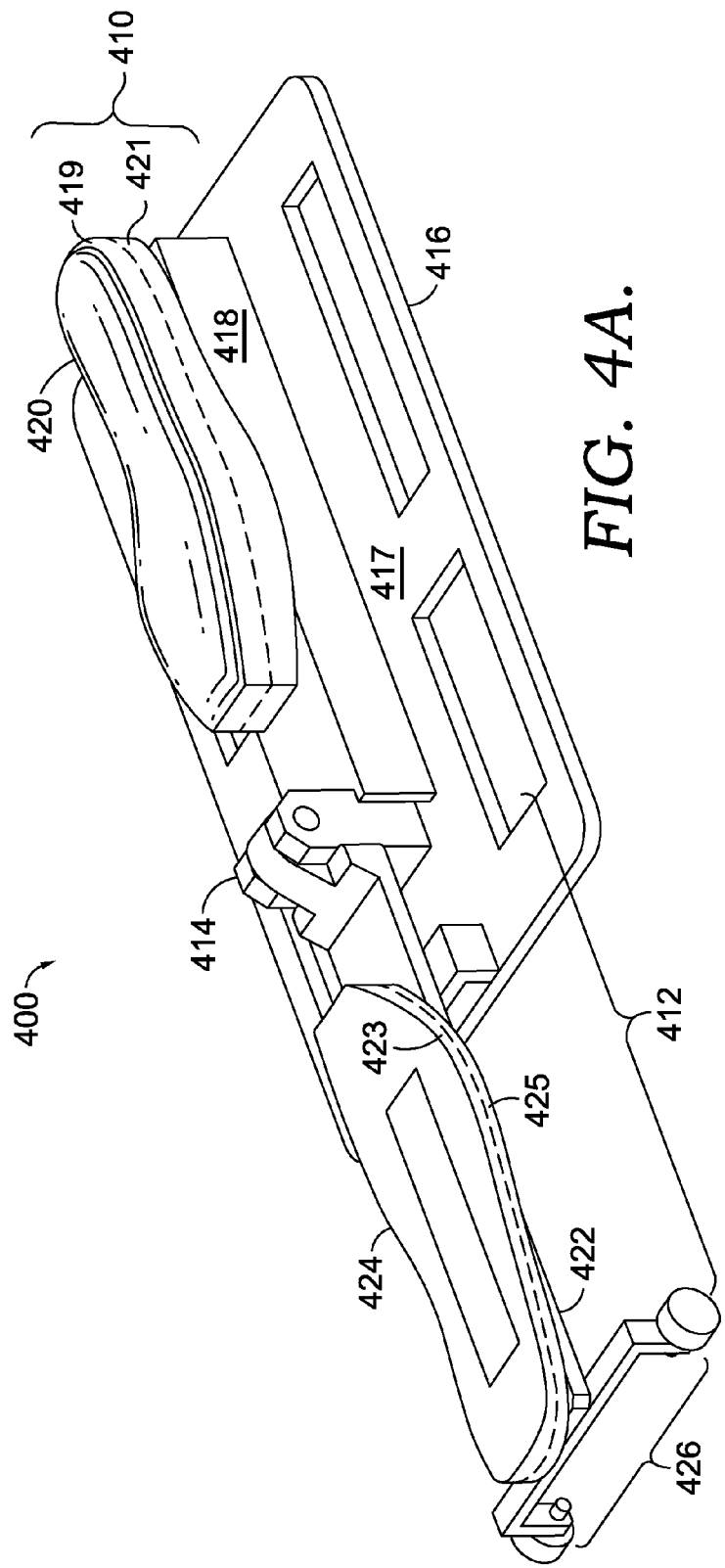
FIG. 4A illustrates an exemplary side perspective view of a jig in an open position in accordance with aspects hereof.

Turning now to FIG. 4A, an exemplary perspective side view of a jig 400 in an open position is illustrated in accordance with aspects provided herein. The jig 400 may comprise a bottom plate 410 and a top plate 412 that is connected to the bottom plate 410 by a pivotable connection 414. More specifically, a second rigid layer 422 of the top plate 412 may be pivotably coupled to a first rigid layer 416 of the bottom plate 410 via the pivotable connection 414. The pivotable connection 414 may comprise any type of connection that enables the top plate 412 to pivot from the open position to a closed position and vice versa such as, for example, a knuckle-and-pin hinge.

The bottom plate 410 may comprise the first rigid or non-deforming layer 416 and a first multi-layer deforming layer 420. The first rigid layer 416 may be constructed from different types of materials having a low degree of deformability and a high degree of hardness such as metals (e.g., aluminum, steel, and the like) or ceramics. The first rigid layer 416 may comprise a base plate 417 and a mounting portion 418. The base plate 417 may be adapted to stabilize and/or secure the jig 400 as the jig 400 is conveyed through a variety of stations such as a painting station, an opening station, an unloading station, a cleaning station, and a loading station. The mounting portion 418 extends vertically away from a midline portion of the base plate 417, in an exemplary aspect, and is adapted to releasably secure one or more sizes and/or shapes of deforming layers such as the first multi-layer deforming layer 420.

The first multi-layer deforming layer 420 has a shape generally corresponding to a shoe sole portion such as the shoe sole portion 200 of FIGS. 2-3. The upper facing or inner surface of the first multi-layer deforming layer 420 as shown in FIG. 4A may have one or more convexities and may be adapted to receive an upper surface of a shoe sole portion such as the upper surface 310 of FIG. 3. As explained in relation to FIG. 3, the upper surface of the shoe sole portion in combination with the side surface of the shoe sole portion generally form at least a partial concavity that can be received onto the partially convex upper facing surface of the first multi-layer deforming layer 420. Coupling the relatively concave upper surface of the shoe sole portion to the somewhat convex first multi-layer deforming layer 420 helps to fix or seat the shoe sole portion onto the jig 400 in an exemplary aspect. The first multi-layer deforming layer 420 may be reversibly fixed to the mounting portion 418 of the bottom plate 410 via one or more affixing technologies such as screws, adhesives, hook-and-loop fasteners, other types of fasteners, and the like.

The first multi-layer deforming layer 420 may comprise two or more sub-layers each having, for example, differing degrees of deformability or hardness. The materials used to construct the first multi-layer deforming layer 420 may be more deformable than the materials used to construct the first rigid layer 416 of the bottom plate 410. In one aspect, the first multi-layer deforming layer 420 may be constructed of materials such as cast PU, rubber, TPU, silicone, and the like. Such materials undergo elastic deformation upon application of pressure but return to their original shape when the pressure is removed.

In one exemplary aspect, the first multi-layer deforming layer 420 may be formed as a single unit. For example, a first sub-layer having a first degree of deformability when cured may be poured into a mold and allowed to partially cure, and a second sub-layer having a second degree of deformability when cured may be poured into the same mold and allowed to partially cure, and so on. In another exemplary aspect, each sub-layer of the first multi-layer deforming layer 420 may be formed separately and joined together via various affixing technologies known in the art such as, for example, adhesives. Any and all such aspects, and any combination thereof, are contemplated as being within the scope contemplated herein.

As mentioned, the different sub-layers of the first multi-layer deforming layer 420 may have differing degrees of deformability. In one exemplary aspect, the differing degrees of deformability may be generated by altering the chemical composition of the different sub-layers. For example, when TPU is used to construct the first multi-layer deforming layer 420, the ratio of polyol to diisocyanate may be altered for each sub-layer to create differing degrees of hardness or deformability.

With respect to FIG. 4A, FIG. 4A depicts the first multi-layer deforming layer 420 as having an inner or facing deforming sub-layer 419 and an outer deforming sub-layer 421 separated by an imaginary dashed line. Although only two sub-layers are shown in FIG. 4A, it is contemplated that the first multi-layer deforming layer 420 may comprise more than two sub-layers. The inner deforming sub-layer 419 is in contact with a shoe sole portion when the jig 400 is in an as-used arrangement, and the outer deforming sub-layer 421 is in contact with the mounting portion 418 of the bottom plate 410 when the jig 400 is in the as-used arrangement. The inner deforming sub-layer 419 may be constructed so that it is softer or more deformable than the outer deforming sub-layer 421. In one exemplary aspect, the inner deforming sub-layer 419 may be constructed such that it has a hardness in the range of 45-55 durometers on the Shore A scale (e.g., ASTM D2240 type A), with an exemplary aspect having a hardness of 50 durometers on the Shore A scale. The outer deforming sub-layer 421 may be constructed such that it has a hardness in the range of 65-75 durometers on the Shore A scale, with an exemplary aspect having a hardness of 70 durometers on the Shore A scale. Additionally, the inner deforming sub-layer 419 may have the same thickness as the outer deforming sub-layer 421 (e.g., a 1:1 ratio of thickness) in one exemplary aspect. However, other thickness ratios are contemplated as being within the scope contemplated herein and may be used to achieve differing degrees of deformation of the first multi-layer deforming layer 420 upon application of pressure to, for example, the top plate 412 of the jig 400.

When the first multi-layer deforming layer 420 comprises more than two sub-layers, the sub-layers may be arranged to create, in an exemplary aspect, a gradient of hardness or deformability extending from an outer sub-layer of the first multi-layer deforming layer 420 (e.g., the sub-layer adjacent to the first rigid layer 416) to an inner, facing sub-layer of the first multi-layer deforming layer 420 (e.g., the sub-layer adjacent to a shoe sole portion when the jig 400 is in a closed position) such that hardness decreases (and deformability increases) when moving from the outer sub-layer to the inner sub-layer of the first multi-layer deforming layer 420. However, it is contemplated that the first multi-layer deforming layer 420 may be comprised of any number of layers. In an exemplary aspect, the first multi-layer deforming layer 420 is comprised of only a single layer, for example.

Because of its deformable properties, the first multi-layer deforming layer 420 may be adapted to receive either a shoe sole portion configured for a right foot or a shoe sole portion configured for a left foot as well as a number of different styles and sizes of shoe sole portions. For example, the first multi-layer deforming layer 420 may be adapted to receive shoe sole portions having a size range of 2 to 3.5 sizes or any range, which may be determined, at least in part, by a hardness of the first multi-layer deforming layer 420. However, it is also contemplated that the first multi-layer deforming layer 420 may be specifically adapted for a specific size, shape, or model in an exemplary aspect. As mentioned, the first multi-layer deforming layer 420 may be reversibly attached to the mounting portion 418 of the bottom plate 410. The first multi-layer deforming layer 420 may be exchanged for a different multi-layer deforming layer (not shown) having similar properties but adapted to receive shoe sole portions having different size ranges and/or different styles.

The top plate 412 of the jig 400 may comprise the second rigid or non-deforming layer 422, a second multi-layer deforming layer 424, and an open-assist mechanism 426. The open-assist mechanism 426 will be explained in greater depth below with respect to FIG. 8. Like the first rigid layer 416, the second rigid layer 422 may be constructed from materials having a low degree of deformation and a high degree of hardness such as metals (e.g., aluminum, steel, and the like) or ceramics. The second rigid layer 422 is adapted to releasably secure one or more sizes and/or shapes of multi-layer deforming layers such as the second multi-layer deforming layer 424. The second multi-layer deforming layer 424 may be reversibly fixed or secured to the second rigid layer 422 of the top plate 412 via one or more affixing technologies such as screws, adhesives, hook-and-loop fasteners, other types of fasteners, and the like.

The second multi-layer deforming layer 424 has a shape generally corresponding to a shoe sole portion such as the shoe sole portion 200 of FIGS. 2-3. The exposed or inner surface of the second multi-layer deforming layer 424 is adapted to generally conform to a lower surface of a shoe sole portion such as the lower surface 210 of FIG. 2. As such, the exposed surface of the second multi-layer deforming layer 424 is relatively flat without significant convexities or concavities.

Like the first multi-layer deforming layer 420, the second multi-layer deforming layer 424 may comprise two or more sub-layers each having, for example, differing degrees of deformability or hardness. The materials used to construct the second multi-layer deforming layer 424 may be more deformable than the materials used to construct the second rigid layer 422 of the top plate 412. In one aspect, the second multi-layer deforming layer 424 may be constructed of materials such as cast PU, rubber, silicone, TPU, and the like. Such materials undergo elastic deformation upon application of pressure but return to their original shape when the pressure is removed.

In one exemplary aspect, the second multi-layer deforming layer 424 may be formed as a single unit. For example, a first sub-layer having a first degree of deformability when cured may be poured into a mold and allowed to partially cure, and a second sub-layer having a second degree of deformability when cured may be poured into the same mold and allowed to partially cure, and so on. In another exemplary aspect, each sub-layer of the second multi-layer deforming layer 424 may be formed separately and joined together via various affixing technologies known in the art such as, for example, adhesives. Any and all such aspects, and any combination thereof, are contemplated as being within the scope contemplated herein.

As mentioned, the different sub-layers of the second multi-layer deforming layer 424 may have differing degrees of deformability. In one exemplary aspect, the differing degrees of deformability may be generated by altering the chemical composition of the different sub-layers. For example, when TPU is used to construct the second multi-layer deforming layer 424, the ratio of polyol to diisocyanate may be altered for each sub-layer to create differing degrees of hardness or deformability.

With respect to FIG. 4A, FIG. 4A depicts the second multi-layer deforming layer 424 as having an inner or facing deforming sub-layer 423 and an outer deforming sub-layer 425 separated by an imaginary dashed line. Although only two sub-layers are shown in FIG. 4, it is contemplated that the second multi-layer deforming layer 424 may comprise more than two sub-layers. The inner deforming sub-layer 423 is in contact with a shoe sole portion when the jig 400 is in an as-used arrangement, and the outer deforming sub-layer 425 is in contact with the rigid layer 422 of the top plate 412 when the jig 400 is in the as-used arrangement. The inner deforming sub-layer 423 may be constructed so that it is softer or more deformable than the outer deforming sub-layer 425. In one exemplary aspect, the inner deforming sub-layer 423 may be constructed such that it has a hardness in the range of 45-55 durometers on the Shore A scale, with an exemplary aspect having a hardness of 50 durometers on the Shore A scale. The outer deforming sub-layer 425 may be constructed such that it has a hardness in the range of 65-75 durometers on the Shore A scale, with an exemplary aspect having a hardness of 70 durometers on the Shore A scale. Additionally, the inner deforming sub-layer 423 may have the same thickness as the outer deforming sub-layer 425 (e.g., a 1:1 ratio of thickness) in one exemplary aspect. However, other thickness ratios are contemplated as being within the scope contemplated herein and may be used to achieve differing degrees of deformation of the second multi-layer deforming layer 424 upon application of pressure to, for example, the top plate 412 of the jig 400 when the jig 400 is in a closed position.

When the second multi-layer deforming layer 424 comprises more than two sub-layers, the sub-layers may be arranged to create, in an exemplary aspect, a gradient of hardness or deformability extending from an outer sub-layer of the second multi-layer deforming layer 424 (e.g., the sub-layer adjacent to the second rigid layer 422) to an inner, facing sub-layer of the second multi-layer deforming layer 424 (e.g., the sub-layer adjacent to a shoe sole portion when the jig 400 is in the as-used arrangement) such that hardness decreases (and deformability increases) when moving from the outer sub-layer to the inner sub-layer of the second multi-layer deforming layer 424.

The second multi-layer deforming layer 424 may have the same deformable properties as the first multi-layer deforming layer 420 of the bottom plate 410. Alternatively, the second multi-layer deforming layer 424 may be more or less deformable than the first multi-layer deforming layer 420 of the bottom plate 410. Additionally, in one aspect, the second multi-layer deforming layer 424 may have a thickness similar to the first multi-layer deforming layer 420. In another aspect, the second multi-layer deforming layer 424 may have a thickness that is less or more than the first multi-layer deforming layer 420. Any and all such aspects, and any variation thereof, are contemplated as being within the scope contemplated herein.

Because of its deformable properties, the second multi-layer deforming layer 424 may be adapted to conform to either a shoe sole portion configured for a right foot or a shoe sole portion configured for a left foot as well as a number of different styles and sizes of shoe sole portions. For example, the second multi-layer deforming layer 424 may be adapted to conform to shoe sole portions having a size range of 2 to 3.5 sizes. However, it is also contemplated that the second multi-layer deforming layer 424 may be specifically adapted for a specific size, shape, or model in an exemplary aspect. As mentioned, the second multi-layer deforming layer 424 may be reversibly attached to the rigid layer 422 of the top plate 412. The second multi-layer deforming layer 424 may be exchanged for a different multi-layer deforming layer (not shown) having similar properties but adapted to conform to shoe sole portions having different size ranges and/or different styles.

As shown more fully below in relation to FIGS. 10-12, the use of deforming layers with multiple sub-layers, such as the first multi-layer deforming layer 420 and the second multi-layer deforming layer 424, where each sub-layer has a different degree of hardness or deformability, enables a more-controlled deformation of the layers 420 and 424 upon the application of pressure to, for example, the top plate 412 of the jig 400 when the jig 400 is in a closed position. For example, having less-deformable or harder outer deforming sub-layers such as the outer deforming sub-layers 421 and 425 prevents the multi-layer deforming layers 420 and 424 from deforming to an extent that a side surface of a shoe sole portion is completely masked by the more deformable inner deforming sub-layers 419 and 423 upon application of pressure to, for example, the top plate 412 of the jig 400. Additionally, the use of less-deformable outer deforming sub-layers also aids in the creation of configurable masking lines along the side surface of the shoe sole portion by the inner deforming sub-layers 419 and 423 upon application of pressure to, for example, the top plate 412 of the jig 400.

The line of demarcation between the inner deforming sub-layers and the outer deforming sub-layers of the multi-layer deforming layers 420 and 424 may be uniform along, for example, the medial and lateral aspects as well as the heel region of the deforming layers 420 and 424 as shown by the dashed line in FIG. 4A. In another exemplary aspect, and as shown in FIG. 4B, the demarcation between the inner deforming sub-layers and the outer deforming sub-layers of the multi-layer deforming layers 420 and 424 may be variable along, for example, the medial and lateral aspects and/or the heel regions of the deforming layers 420 and 424. As shown in FIG. 4B and with particular reference to the first multi-layer deforming layer 420, the inner deforming sub-layer 419, in an exemplary aspect, may comprise a greater proportion of the first multi-layer deforming layer 420 along the medial and lateral sides of the deforming layer 420 at a midfoot region as compared to the medial and lateral sides near the toe region and the heel region of the deforming layer 420. Such an arrangement is useful to generate functionally different amounts of deformation to, for example, the first multi-layer deforming layer 420 upon the application of pressure to, for example, the top plate 412 of the jig 400 when the jig 400 is in a closed position. Upon application of pressure to, for example, the top plate 412 of the jig 400, a greater amount of deformation of the deforming layer 420 would be created at the midfoot region as compared to the toe region and the heel region of the first multi-layer deforming layer 420. This may be useful when it is desired to mask, for example, more of the side surface of a shoe sole portion at the midfoot region as compared to the side surface near the toe and heel regions of the shoe sole portion. The discussion of variable demarcation lines with respect to the first multi-layer deforming layer 420 is equally applicable to the second multi-layer deforming layer 424. Additional configurations of the line of demarcation between the inner and outer deforming layers are contemplated as being within the scope contemplated herein.

While a specific configuration of a jig having a top plate and a bottom plate is described herein, it is contemplated that additional and alternative configurations may be implemented. For example, a medial and a lateral, a toe-end and a heel-end, and other multi-part configurations are contemplated herein.

Figure 5:
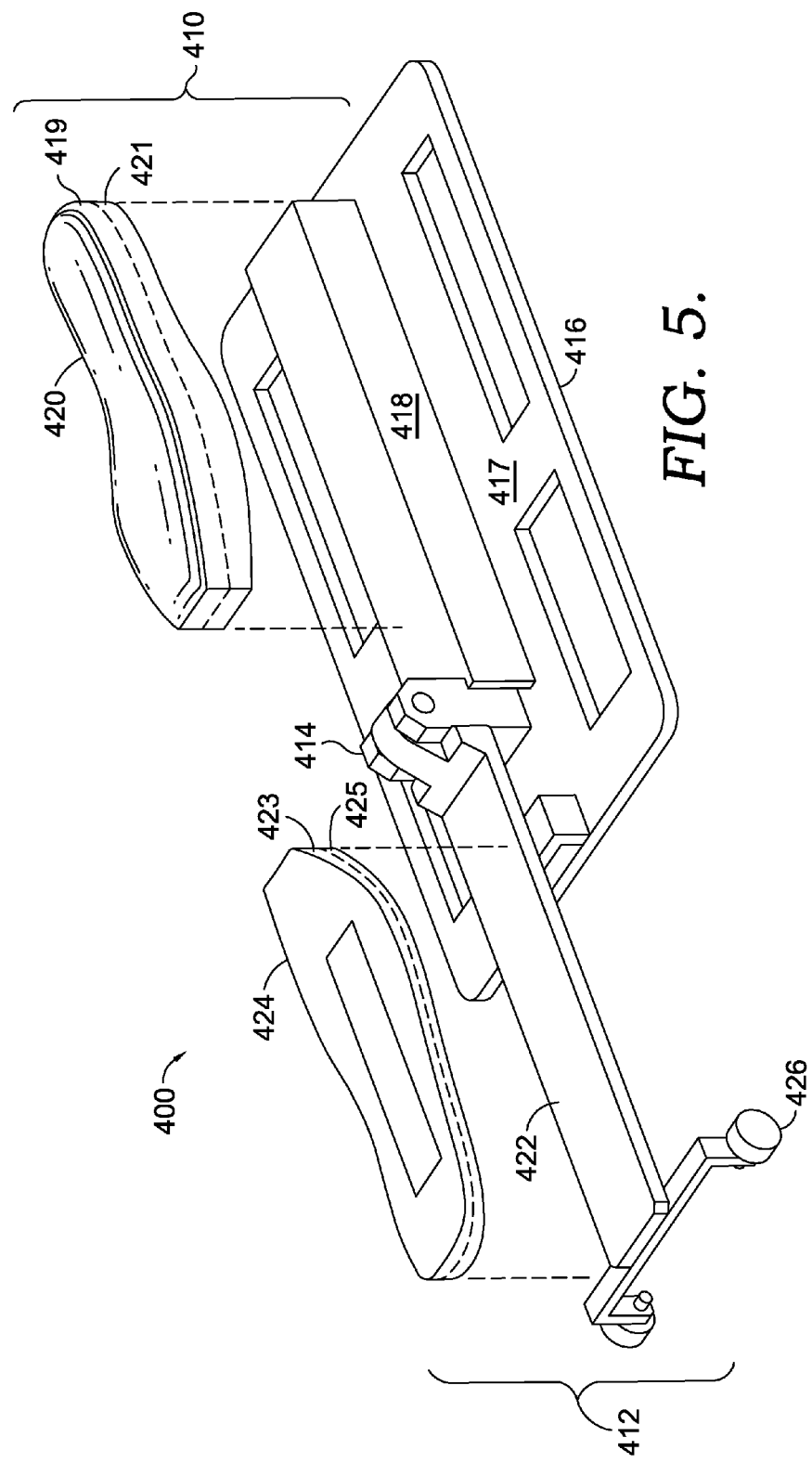
FIG. 5 illustrates an exemplary side perspective view of a jig with deforming layers removed from rigid layers of the jig in accordance with aspects hereof.

FIG. 5 shows a side perspective view of the jig 400 with the first multi-layer deforming layer 420 being removed from the mounting portion 418 of the bottom plate 410. Likewise, FIG. 5 further depicts the second multi-layer deforming layer 424 being removed from the second rigid layer 422 of the top plate 412. Removal of the first multi-layer deforming layer 420 and/or the second multi-layer deforming layer 424 is dependent upon the type of affixing technology used to affix the deforming layers 420 and 424 to the rigid layers 416 and 422. For example, if screws are used, the screws may be loosened and the deforming layers 420 and 424 removed. After removal, new multi-layer deforming layers adapted to different ranges of shoe sole portion sizes, styles, and/or models may be reversibly fixed to the first rigid layer 416 and/or the second rigid layer 422. Constructing the jig 400 in such a manner makes it adaptable to a multitude of styles and sizes of shoe sole portions while allowing for portions of the jig to be universal, which reduces the costs associated with manufacturing shoes.

Figure 6:
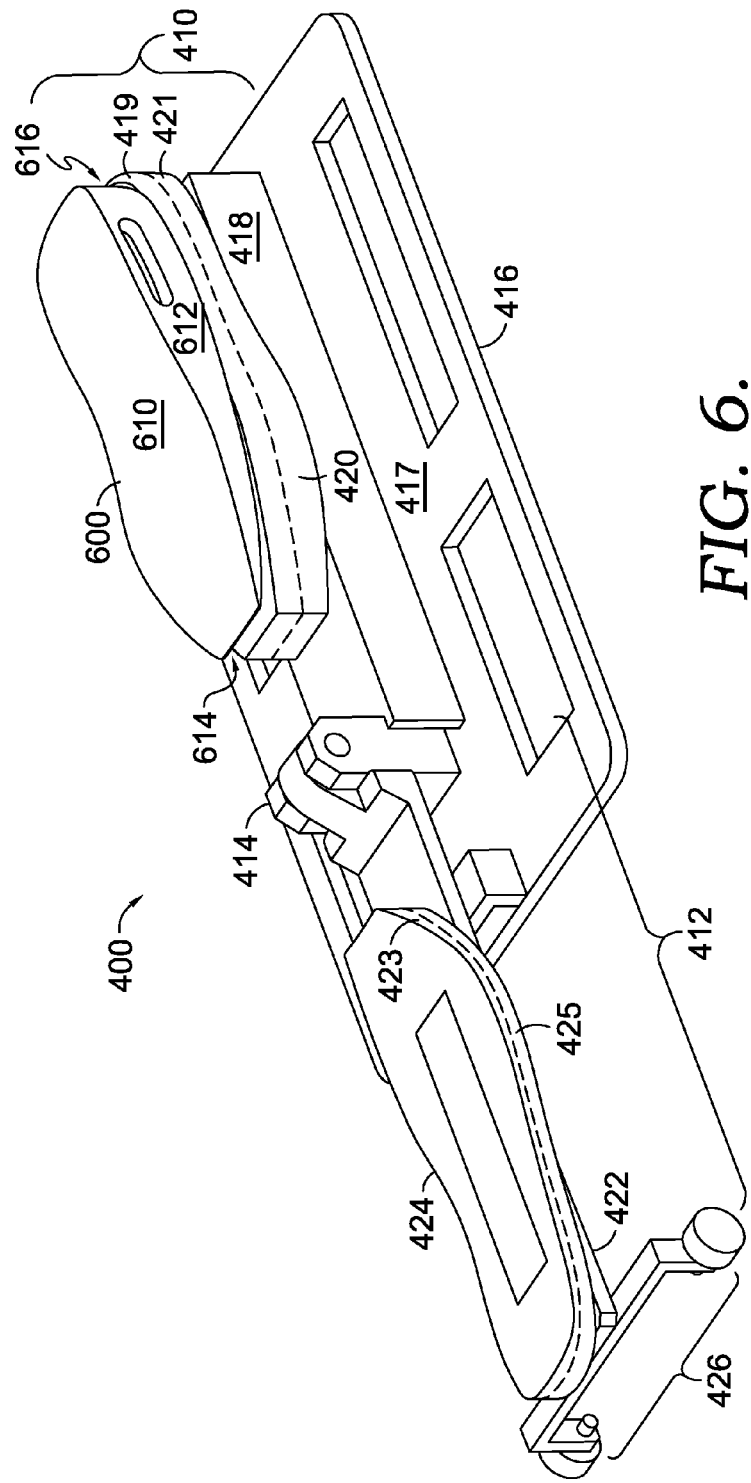
FIG. 6 illustrates an exemplary side perspective view of a jig with a shoe sole portion placed on a bottom plate of the jig while the jig is in an open position in accordance with aspects hereof.

FIG. 6 illustrates a side perspective view of the jig 400 in an open position with an upper surface of a shoe sole portion 600 positioned on the first multi-layer deforming layer 420 of the bottom plate 410. The shoe sole portion 600 may comprise the upper surface (not seen) such as the upper surface 310 of FIG. 3, a lower surface 610 such as the lower surface 210 of FIG. 6, and a side surface 612 such as the side surface 212 of FIGS. 2-3.

The upper surface of the shoe sole portion 600 is placed adjacent to the first multi-layer deforming layer 420 while the jig 400 is in an open position such that the shoe sole portion 600 is in an inverted or upside-down position. More specifically, the upper surface of the shoe sole portion 600 is placed adjacent to the inner deforming sub-layer 419 of the first multi-layer deforming layer 420. As such, the lower surface 610 of the shoe sole portion faces away from the first multi-layer deforming layer 420. The shoe sole portion 600 is positioned so that a toe region 614 of the shoe sole portion 600 is proximal to or faces the pivotable connection 414 and a heel region 616 of the shoe sole portion 600 is distal to or faces away from the pivotable connection 414.

It is contemplated that orienting the shoe sole portion 600 in the manner described above provides for several advantages. For example, by orienting the heel region 616 of the shoe sole portion 600 away from the pivotal connection 414, a continuous application of material may be permitted as an applicator (e.g., a spray nozzle) traverse the shoe sole portion 600 from a lateral side to a medial side. Because the heel region 616 of the shoe sole portion 600 may have a greater side surface area than the toe region 614, it also may be desirable from an application of paint perspective to have a more unobstructed spaying path at the heel end rather than at the toe end of the shoe sole portion 600. Similarly, it is contemplated that because the upper surface of the shoe sole portion 600 may have a generally concave shape, inverting the shoe sole portion 600 may eliminate concerns related to potential pooling of liquid that may infiltrate the jig 400 in the concavity of the upper surface of the shoe sole portion 600. Further, as will be discussed with respect to FIGS. 29-30, a seating mechanism may be more effective in relation to the heel region 616 being opposite the pivotal connection 414 rather than the toe region 614 being opposite the pivotal connection 414. Additionally, the interaction between the first multi-layer deforming layer 420 and the upper surface of the shoe sole portion 600 may be more effective for the seating mechanism than having the lower surface 610 of the shoe sole portion 600 positioned on the first multi-layer deforming layer 420, in an exemplary aspect.

Figure 7:
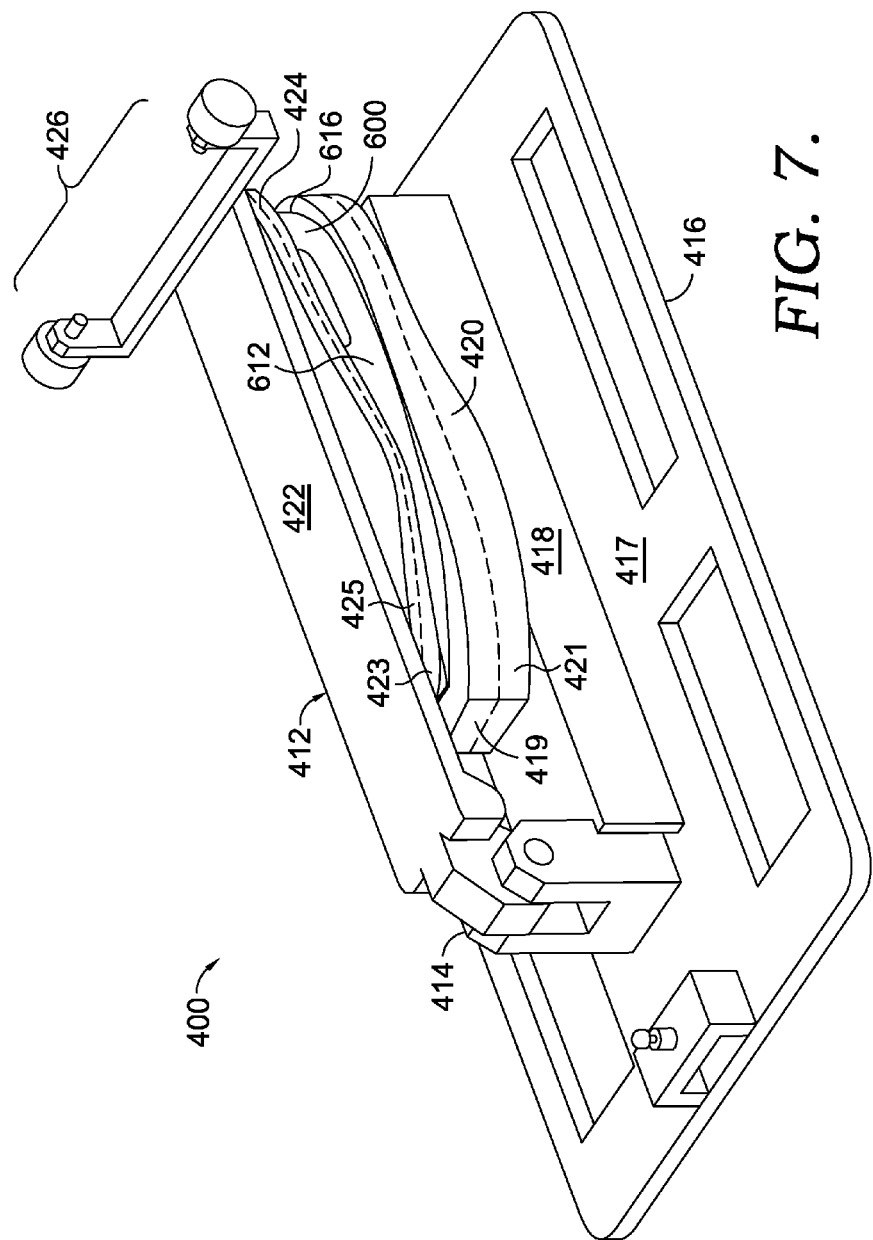
FIG. 7 illustrates an exemplary side perspective view of a jig with a shoe sole portion secured between a top plate and a bottom plate of the jig while the jig is in a closed position in accordance with aspects hereof.

FIG. 7 depicts a side perspective view of the jig 400 in a closed position with the shoe sole portion 600 secured between the first multi-layer deforming layer 420 and the second multi-layer deforming layer 424. The top plate 412 has been pivoted closed via the pivotable connection 414 so that the second multi-layer deforming layer 424 covers the lower surface 610 of the shoe sole portion 600 and the second rigid layer 422 is facing upward. More specifically, the inner deforming sub-layer 423 of the second multi-layer deforming layer 424 covers the lower surface 610 of the shoe sole portion 600. Further, when the jig 400 is in the closed position, the open-assist mechanism 426 may face in the direction of the heel region 616 of the shoe sole portion 600. The side surface 612 of the shoe sole portion 600 is left exposed along at least its lateral side, its medial side, and at its heel region 616. As explained in greater depth below, pressure may be applied to, for example, the second rigid layer 422 of the top plate 412 which causes both the first and second multi-layers deforming layers 420 and 424 to deform to a degree that the upper surface and the lower surface 610 of the shoe sole portion 600 are completely covered by the deforming layers 420 and 424 but at least a portion of the side surface 612 is left exposed.

Figure 8:
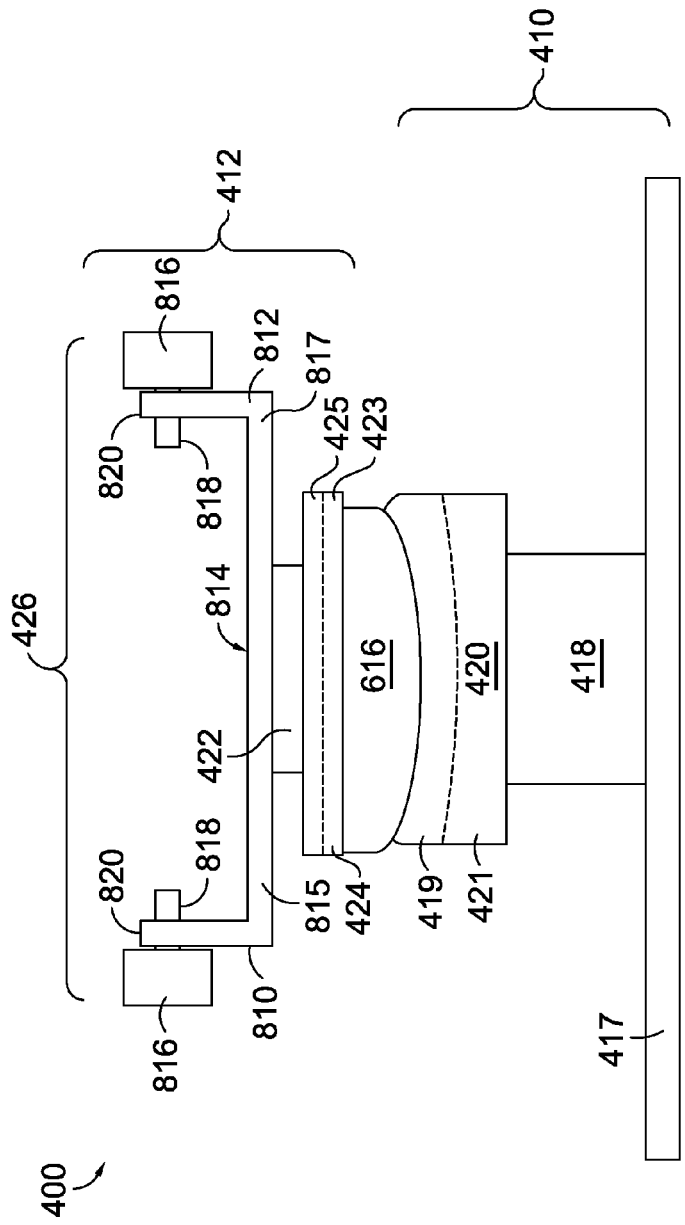
FIG. 8 illustrates an exemplary front elevation view of a jig in a closed position in accordance with aspects hereof.

FIG. 8 depicts a front elevation view of the jig 400 in a closed position taken from the perspective of the heel region 616 of the shoe sole portion 600. FIG. 8 illustrates a front view of the bottom plate 410 comprising the base plate 417, the mounting portion 418, and the first multi-layer deforming layer 420. As seen, the mounting portion 418 extends vertically away from at least a midline portion of the base plate 417 in an exemplary aspect. Additionally, FIG. 8 depicts a front view of the top plate 412 comprising the open-assist mechanism 426, the second rigid layer 422, and the second multi-layer deforming layer 424. The shoe sole portion 600 is secured between the first and second multi-layer deforming layers 420 and 424 as shown in the front view of FIG. 8.

The open-assist mechanism 426 is adapted to work in conjunction with an opening station to translate longitudinal movement of the jig 400 into an opening force that transitions the jig 400 from the closed position to an open position after the shoe sole portion 600 is painted. Longitudinal direction is defined as extending from a heel-maintaining end of the jig 400 to a toe-maintaining end of the jig 400. Once the jig 400 is in the open position, the shoe sole portion 600 may be removed and inverted to an upright position for subsequent drying. The open-assist mechanism 426 may be positioned at a first end (e.g., the heel-maintaining end) of the second rigid layer 422 opposite of a second end (e.g., the toe-maintaining end) of the second rigid layer 422 that is pivotably coupled to the first rigid layer 416 of the bottom plate 410 via the pivotable connection 414.

In one aspect, as illustrated, the open-assist mechanism 426 may comprise a first vertical portion 810, a second vertical portion 812, and a horizontal portion 814 that connects the first vertical portion 810 to the second vertical portion 812. The horizontal portion 814, in turn, may comprise a first member 815 that extends beyond a lateral side of the second rigid layer 422 of the top plate, and a second member 817 that extends beyond a medial side of the second rigid layer 422 of the top plate 412. The first member 815 and the second member 817 may be portions of a uniform material forming the horizontal portion 814 in an exemplary aspect. The terms "lateral" and "medial" may be interchangeable depending upon whether the jig 400 is securing a shoe sole portion configured for a left foot or a shoe sole portion configured for a right foot. At least a segment of the horizontal portion 814 is secured to the second rigid layer 422 of the top plate 412 via welding, adhesives, and the like. The first vertical portion 810, the second vertical portion 812, and the horizontal portion 814 may be constructed from rigid, non-deforming, durable materials such as metal (aluminum, steel, and the like) and/or ceramic.

In the illustrated aspect, the first vertical portion 810 and the second vertical portion 812 are perpendicular to or 90 degrees in relation to the first member 815 and the second member 817 of the horizontal portion 814 respectively and extend vertically away from the top plate 412. This vertical extension may aid in the opening and positioning of the jig 400 when interfacing with a slide rail, as will be discussed in more detail hereinafter. In other aspects, the first vertical portion 810 and the second vertical portion 812 may be more than 90 degrees in relation to the first member 815 and the second member 817 such as 95 degrees, 100 degrees, 105 degrees, 110 degrees and any variation thereof and angle away from an imaginary midline of the top plate 412.

In the illustrated aspect, each of the first vertical portion 810 and the second vertical portion 812 may comprise a roller knob 816 secured near a terminal end 820 of the first and second vertical portions 810 and 812 via, for example, a pin 818. The roller knobs 816 are adapted to rotate freely through a 360 degree range of motion upon contact with, for example, guide plates of an opening mechanism associated with an opening station. The roller knobs 816 may be constructed of durable materials such as hard rubber, polyurethane, plastic, metal, and the like.

In another aspect, the open-assist mechanism 426 may comprise just the horizontal portion 814 having the first member 815 extending beyond the lateral side of the second rigid layer 422 and the second member 817 extending beyond the medial side of the second rigid layer 422. The first and second members 815 and 817 of the horizontal portion 814 are also adapted to engage guide plates of an opening mechanism associated with an opening station.

Figure 9:
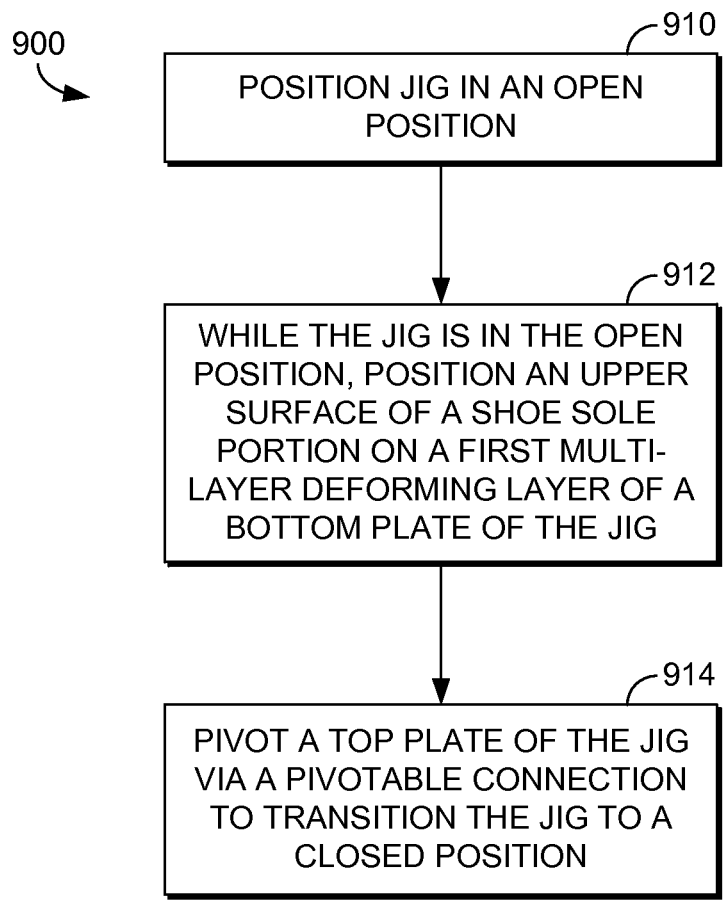
FIG. 9 illustrates a flow diagram of an exemplary method of securing a shoe sole portion in a jig in accordance with aspects hereof.

Turning now to FIG. 9, FIG. 9 depicts a flow diagram of an exemplary method of using a jig, such as the jig 400 of FIGS. 4-8, to secure a shoe sole portion, such as the shoe sole portion 600, during an automated painting process. At a step 910, the jig is positioned in an open position. The jig may comprise a bottom plate, such as the bottom plate 410, having a first multi-layer deforming layer that is releasably secured to a first rigid or non-deforming layer. The first multi-layer deforming layer may be the same as the first multi-layer deforming layer 420, and the first rigid layer may be the same as the first rigid layer 416. The jig may further comprise a top plate, such as the top plate 412 that is pivotably coupled to the bottom plate via a pivotable connection such as the pivotable connection 414. The top plate may comprise a second multi-layer deforming layer that is releasably secured to a second rigid or non-deforming layer. The second multi-layer deforming layer and the second rigid layer may be the same as the second multi-layer deforming layer 424 and the second rigid layer 422 of the jig 400.

At a step 912, while the jig is in the open position, an upper surface of a shoe sole portion, such as the upper surface 310 of the shoe sole portion 200 of FIG. 3, is positioned on the first multi-layer deforming layer of the bottom plate either manually or by an automated process. The shoe sole portion is positioned such that a toe region of the shoe sole portion is proximal to or facing the pivotable connection between the top plate and the bottom plate, and a heel region of the shoe sole portion is distal to or facing away from the pivotable connection. In one aspect, once the shoe sole portion is placed on the first multi-layer deforming layer, a seating mechanism is used to apply momentary pressure to the heel region of the shoe sole portion to ensure the shoe sole portion is securely seated on the first multi-layer deforming layer. This aspect will be discussed in greater depth below.

At a step 914, the top plate of the jig is rotated towards the bottom plate via the pivotable connection to transition the jig to a closed position. The transitioning of the jig from the open position to the closed position may be carried out manually or by an automated process. When the jig is in the closed position, the second multi-layer deforming layer of the top plate covers a lower surface of the shoe sole portion. Further, when the jig is in the closed position, the upper and lower surfaces of the shoe sole portion are completely covered or masked by the first multi-layer deforming layer of the bottom plate and the second multi-layer deforming layer of the top plate respectively, and at least a portion of a side surface of the shoe sole portion is left exposed, in an exemplary aspect. It is further contemplated that one or more portions of the top surface and/or the bottom surface of the shoe sole portion may also be left exposed to receive an application of a material, such as paint, in an exemplary aspect. Any and all such variations, and any combination thereof, are contemplated as being within the scope contemplated herein.

The method 900 may further comprise automatically and without human intervention painting the at least the portion of the side surface of the shoe sole portion while it is secured in the closed jig. As used herein, the phrase "without human intervention" is intended to convey that at the time of the method 900 being performed, a human is not actively performing the process. However, it is contemplated that a human may initiate or otherwise start the method 900, in an exemplary aspect. After painting, the jig may be automatically and without human intervention transitioned from the closed position to the open position and the shoe sole portion unloaded from the jig. When being unloaded from the jig, the shoe sole portion may be inverted to an upright position and placed on a transport assembly that transports the shoe sole portion to a drying station. Further, after the shoe sole portion is unloaded from the jig, the jig may then be transported to a cleaning station.

Figure 12:
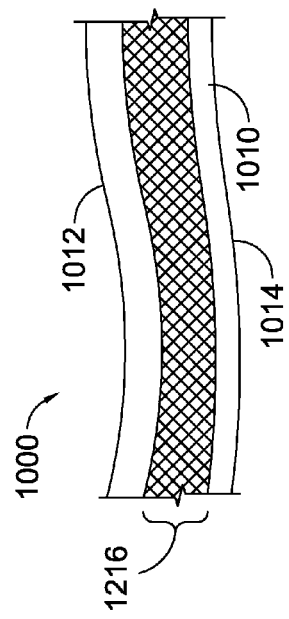
FIG. 12 illustrates the exemplary portion of the side surface of the shoe sole portion of FIG. 11 after being painted in accordance with aspects hereof.
Figure 10:
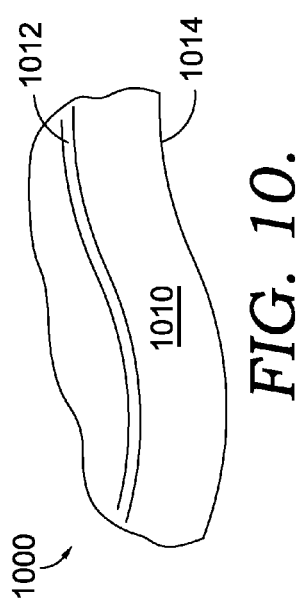
FIG. 10 illustrates an exemplary portion of an unpainted side surface of a shoe sole portion in accordance with aspects hereof.
Figure 11:
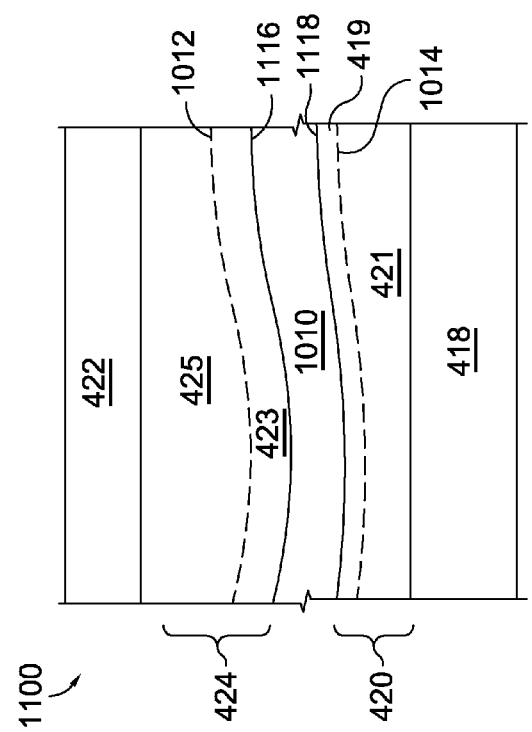
FIG. 11 illustrates exemplary masking lines on the portion of the side surface of the shoe sole portion of FIG. 10 created by deforming layers of a jig when the shoe sole portion is secured in the jig in accordance with aspects hereof.

FIGS. 10-12 depict several close-up views of a segment of a side surface of a shoe sole portion before painting, while being partially masked by deforming layers of a jig, and after painting respectively. Specifically, FIG. 10 depicts a close-up view of a portion of a side surface 1010 of a shoe sole portion 1000 before painting. The side surface 1010 may be a portion of the side surface 212 of FIGS. 2-3. The side surface 1010 includes an upper edge 1012 and a lower edge 1014.

FIG. 11 depicts a close-up view, referenced generally by the numeral 1100, of a portion of the side surface 1010 of the shoe sole portion 1000 while it is secured by the jig 400 and while pressure is applied to, for example, the top plate 412 of the jig 400. A portion of the second rigid layer 422 of the top plate 412 of the jig 400 is shown as well as a portion of the second multi-layer deforming layer 424 of the top plate 412 where the second multi-layer deforming layer 424 comprises the inner deforming sub-layer 423 and the outer deforming sub-layer 425.

As seen in FIG. 11, the inner deforming sub-layer 423 of the second multi-layer deforming layer 424 overlaps the upper edge 1012 (shown as a dotted line) of the side surface 1010 to create a first masking line 1116. In one exemplary aspect, the inner deforming sub-layer 423 overlaps the upper edge 1012 of the side surface 1010 because the inner deforming sub-layer 419 is softer and more deformable than, for example, the outer deforming sub-layer 425. The position of the first masking line 1116 is configurable and may be altered by the application of different amounts of pressure to, for example, the second rigid layer 422 of the top plate 412. The application of different amounts of pressure to the second rigid layer 422 causes differing degrees of deformation of the second multi-layer deforming layer 424 thereby causing the inner deforming sub-layer 423 of the second multi-layer deforming layer 424 to cover more or less of the side surface 1010. Additionally, the position of the first masking line 1116 may also be configurable by altering the deformability properties of the inner deforming sub-layer 423 and/or the outer deforming sub-layer 425, and/or by altering the thickness of the inner deforming sub-layer 423 as compared to the outer deforming sub-layer 425.

In one example, the first masking line 1116 may coincide with the upper edge 1012 of the side surface 1010 (e.g., via the application of lower amounts of pressure to the second rigid layer 422). In other examples, the first masking line 1116 may be positioned below the upper edge 1012 of the side surface 1010 (e.g., via the application of higher amounts of pressure to the second rigid layer 422). Any and all such aspects, and any variation thereof, are contemplated as being within the scope contemplated herein. The position of the first masking line 1116 may be programmable and may be dependent upon the style and/or size of the shoe sole portion 1000 and/or it may be dependent upon the characteristics of the particular jig used to secure the shoe sole portion 1000.

FIG. 11 further depicts a segment of the mounting portion 418 of the bottom plate 410 of the jig 400 as well as a portion of the first multi-layer deforming layer 420 of the bottom plate 410, where the first multi-layer deforming layer 420 comprises the inner deforming sub-layer 419 and the outer deforming sub-layer 421.

As seen in FIG. 11, the inner deforming sub-layer 419 of the first multi-layer deforming layer 420 overlaps the lower edge 1014 (shown as a dotted line) of the side surface 1010 of the shoe sole portion 1000 to create a second masking line 1118. The creation of the second masking line 1118 may be possible because the inner deforming sub-layer 419 is more deformable than the outer deforming sub-layer 421. The position of the second masking line 1118 is configurable and may be altered by the application of different amounts of pressure to the second rigid layer 422 of the top plate 412 of the jig 400. The application of different amounts of pressure to the second rigid layer 422 causes differing degrees of deformation of the first multi-layer deforming layer 420 thereby causing the first multi-layer deforming layer 420 (specifically the inner deforming sub-layer 419) to cover more or less of the side surface 1010. Additionally, the position of the second masking line 1118 may also be configurable by altering the deformable properties of the inner deforming sub-layer 419 and/or the outer deforming sub-layer 421, and/or by adjusting the ratio of thickness of the inner deforming sub-layer 419 to the outer deforming sub-layer 421.

In one example, the second masking line 1118 may coincide with the lower edge 1014 of the side surface 1010 (e.g., via the application of lower amounts of pressure to the second rigid layer 422). In other examples, the second masking line 1118 may be positioned above the lower edge 1014 of the side surface 1010 (e.g., via the application of higher amounts of pressure to the second rigid layer 422). Any and all such aspects, and any variation thereof, are contemplated as being within the scope contemplated herein. The position of the second masking line 1118 may be programmable and may be dependent upon the style and/or size of the shoe sole portion 1000 and/or it may be dependent upon the characteristics of the particular jig used to secure the shoe sole portion 1000.

FIG. 12 depicts the side surface 1010 of the shoe sole portion 1000 after being painted and removed from the jig 400. A painted area 1216 corresponds to the area between the first masking line 1116 created by the second multi-layer deforming layer 424 and the second masking line 1118 created by the first multi-layer deforming layer 420, as depicted in FIG. 11. As described above, the dimensions of the painted area 1216 may be altered via the application of differing amounts of pressure to the second rigid layer 422 of the top plate, by altering the deformability characteristics of, for example, the inner deforming sub-layers 419 and 423 or the outer deforming sub-layers 421 and 425, and/or by altering the thickness ratio between the inner deforming sub-layers 419 and 423 and the outer deforming sub-layers 421 and 425. The ability to create configurable and/or programmable masking lines through the use of a jig eliminates the labor-intensive practice of having to manually tape the shoe sole portion prior to painting.

Figure 13:
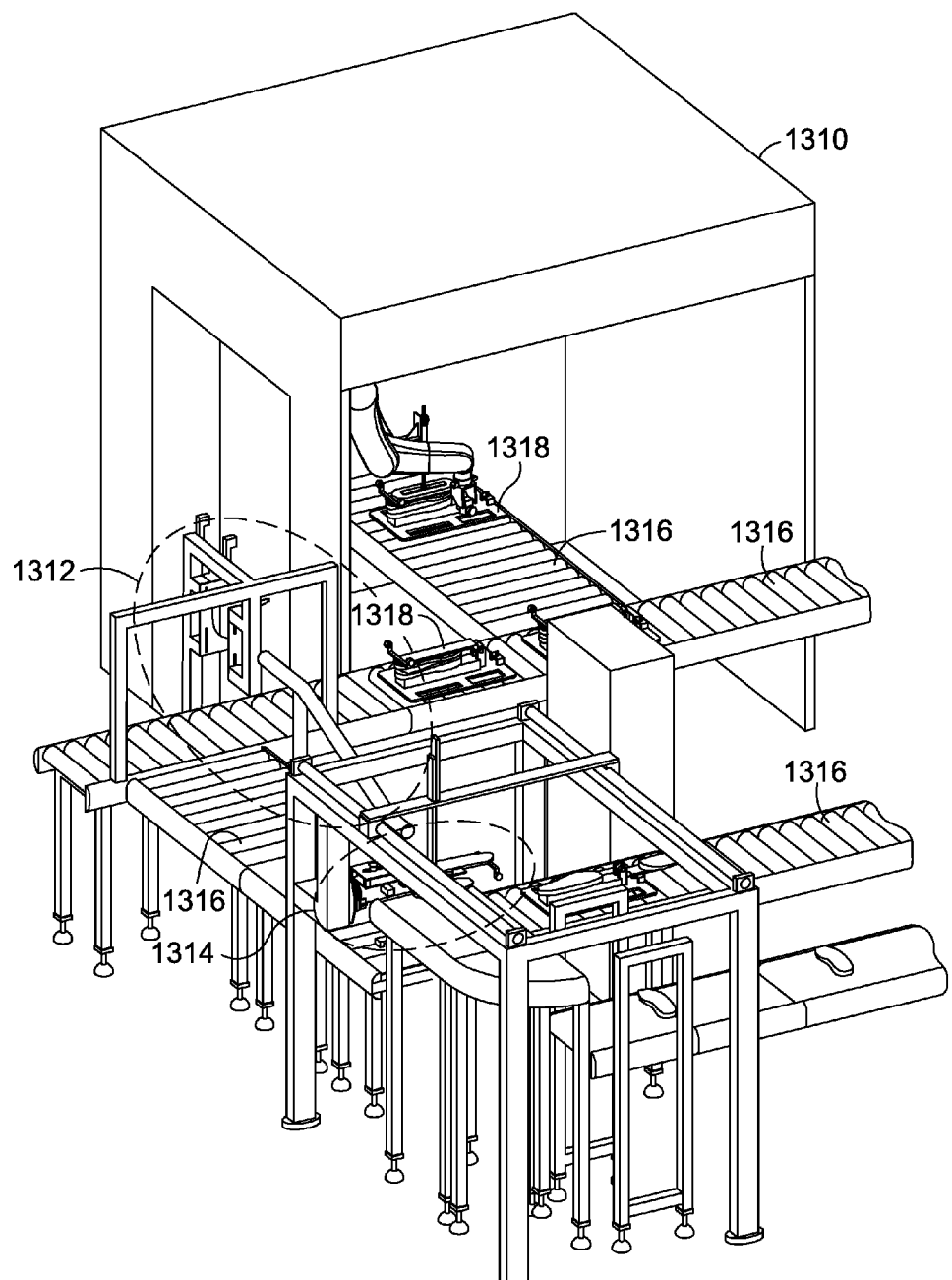
FIG. 13 illustrates an exemplary overview of a shoe sole portion painting system in accordance with aspects hereof.

Turning now to FIG. 13, FIG. 13 depicts an overview of a shoe sole portion painting system 1300 that may comprise a painting station 1310, an opening station 1312, an unloading station 1314, a transport assembly 1316, a plurality of jigs 1318 securing shoe sole portions, one or more sensors (not shown), and one or more computing devices (not shown). The number of stations in the shoe sole portion painting system 1300 is configurable and may include more stations or fewer stations than those shown in FIG. 13. For instance, the shoe sole portion painting system 1300 may further comprise a loading station where unpainted shoe sole portions are loaded into the jigs 1318, a shoe sole portion drying station where the shoe sole portions are dried after painting, a jig cleaning station where the jigs 1318 are cleaned prior to being loaded with unpainted shoe sole portions, and/or a shoe sole portion quality checking station. Further, it is contemplated that the relative location of the various stations may be altered to fit an available footprint. Any and all such aspects, and any variation thereof, are contemplated as being within the scope contemplated herein.

The jigs 1318 may, in one aspect, comprise the jig 400 discussed above. However, it is contemplated that the painting system 1300 is not limited to the use of this type of jig. Any jig having a bottom plate, a top plate pivotably-coupled to the bottom plate, and some type of open-assist mechanism affixed to the top plate is contemplated as being within the scope contemplated herein. Additionally, it is contemplated that aspects hereof are not limited to a pivoting coupling, but instead contemplate sliding, rotating, rolling, and other concepts. Further, it is contemplated that a "top" and a "bottom" plate may instead be a generically stated "side A" and a "side B" plate having no specific top/bottom, left/right, front/back designated relationship while staying in the scope of aspects provided herein.

In general, after unpainted shoe sole portions are loaded into the jigs 1318 at the loading station (not shown in FIG. 13), the jigs 1318 are transported one at a time to the painting station 1310 via the transport assembly 1316 and at least the side surfaces of the shoe sole portions are automatically painted. In one aspect, the transport assembly 1316 may comprise a roller conveyor assembly that utilizes rotating rods to transport the jigs 1318 along predefined paths. The rotating rods, in turn, are actuated by, for example, conveyor belts. The transport assembly 1316 may utilize a variety of actuated pushers to push the jigs 1318 from a first set of rollers onto a second set of rollers that may be perpendicular to the first set of rollers.

After painting, the jigs 1318 with the painted shoe sole portions are transported one at a time to the opening station 1312 via the transport assembly 1316 where the longitudinal movement of the jigs 1318 is translated by guide plates into an opening force that transitions the jigs 1318 from the closed position to an open position. The open jigs 1318 with the painted shoe sole portions are then transported one at a time via the transport assembly 1316 to the unloading station 1314 where the painted shoe sole portions are removed from the jigs 1318. The jigs 1318 without the shoe sole portions may then be transported via the transport assembly 1316 to the cleaning station (not shown in FIG. 13) where they are cleaned, and the painted shoe sole portions may be transported via the transport assembly 1316 to the drying station and the quality checking station (not shown in FIG. 13). After cleaning, the jigs 1318 may then be transported by the transport assembly 1316 back to the loading station where additional unpainted shoe sole portions are secured in the jigs 1318. The process then repeats itself.

The configuration of the stations 1310, 1312, and 1314 show in FIG. 13 is merely exemplary and is not meant to be limiting. Each of the stations 1310, 1312, and 1314 is modular and may be positioned in a variety of configurations. The transport assembly 1316 may then be adjusted to conform to the new configuration. For example, the opening station 1312 may be positioned immediately outside of the painting station 1310. Further, it is contemplated that there may be more than one of each of the stations 1310, 1312, and 1314. For instance, there may be two painting stations 1310, each operating at the same time. The two painting stations 1310 may each feed into the opening station 1312 and the unloading station 1314. Alternatively, there may be an opening station 1312 and an unloading station 1314 associated with each painting station 1310. Any and all such variations, and any combination thereof, are contemplated as being within the scope contemplated herein.

The sensors associated with the shoe sole portion painting system 1300 may be used to detect the position and/or movement of various components of the shoe sole portion painting system 1300. The computers associated with the shoe sole portion painting system 1300 may be used to programmably couple the various stations and/or components of the shoe sole portion painting system 1300 and coordinate actions associated with the stations and/or components.

Figure 14:
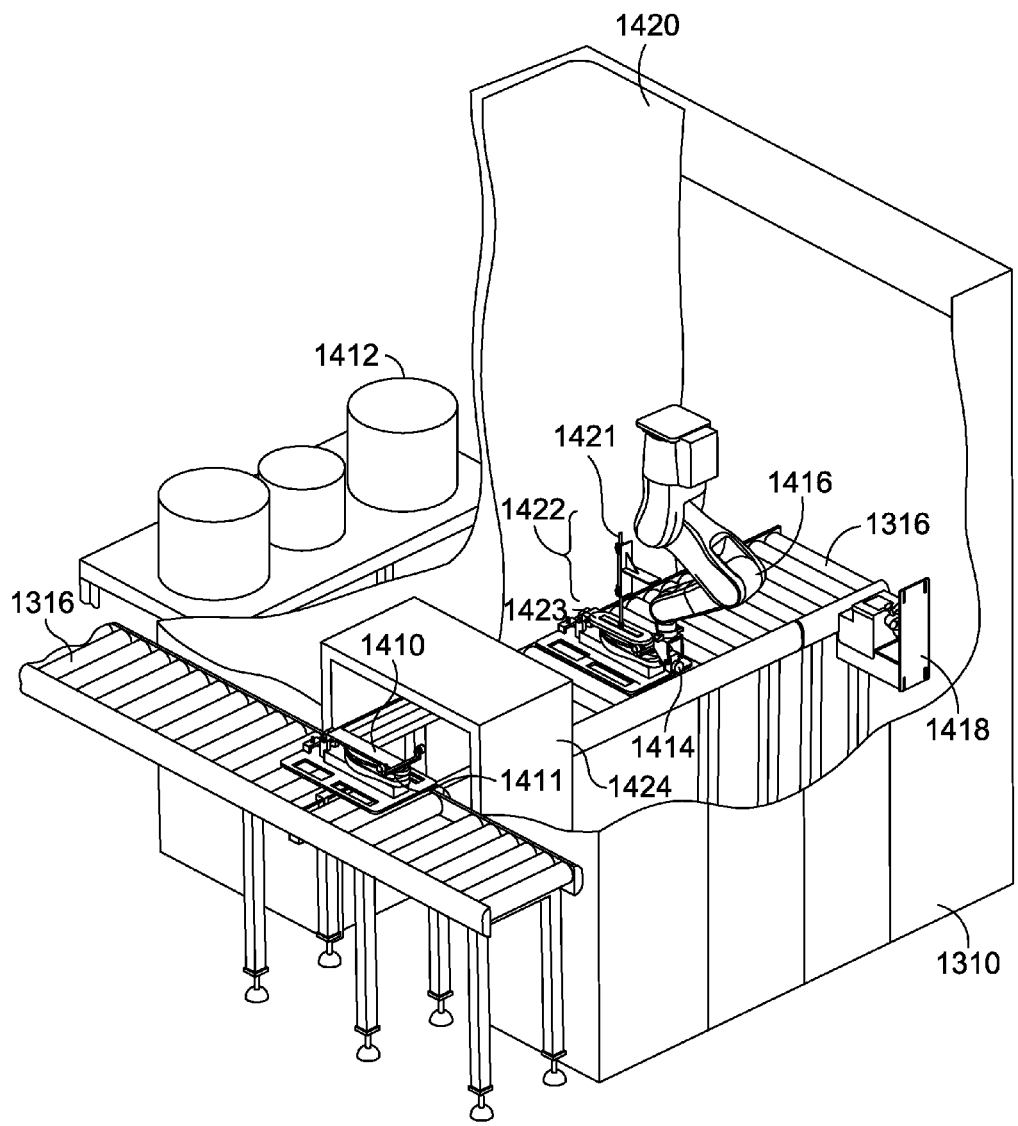
FIG. 14 illustrates an exemplary overview of a painting station of a shoe sole portion painting system in accordance with aspects hereof.

Turning now to FIGS. 14-18, FIGS. 14-18 depict a movement of a jig 1410 securing a shoe sole portion 1411 through the painting station 1310 and details associated with the painting station 1310. With respect specifically to FIG. 14, FIG. 14 depicts an exemplary overview of the painting station 1310. The painting station 1310 may comprise a paint supply unit 1412, a painting nozzle 1414 attached to a 6-axis robot 1416, a nozzle cleaning unit 1418, a water curtain 1420 (a portion of which is shown), a jig pressing unit 1422, a staging area 1424, one or more sensors (not shown), and one or more computing devices (not shown). Some or all of the different components of the painting station 1310 may be programmably coupled to each other via the computing devices and communicate information to each other regarding the status of each of the components (e.g., resting versus active). Further, the painting station 1310 may include additional components or fewer components than the components 1412, 1414, 1416, 1418, 1420, 1422, and 1424 shown in FIG. 14.

The paint supply unit 1412 may comprise a water container used by the nozzle cleaning unit 1418 to clean the painting nozzle 1414, paint containers for storing paint used to paint the shoe sole portion 1411 or other shoe sole portions, waste containers for storing liquid waste, and/or metering and valve systems for controlling the amount of paint distributed to the painting nozzle 1414.

The painting nozzle 1414 includes a spray head for painting the shoe sole portion 1411. As mentioned, the painting nozzle 1414 is attached to an arm of the 6-axis robot 1416. The 6-axis robot 1416 is able to move freely through a three-dimensional Cartesian coordinate system. Additionally, the 6-axis robot 1416 carries a paint supply pipe that, in turn, is connected to the paint supply unit 1412. The nozzle cleaning unit 1418 may be used to clean the painting nozzle 1414 after, for example, painting a shoe sole portion or a series of shoe sole portions. The water curtain 1420 may be used to collect over-spray and to maintain cleanliness of the painting station 1310.

The jig pressing unit 1422 may comprise an actuator 1421, such as a pneumatic cylinder, connected at one end to a pressing foot 1423. The actuator 1421 acts to raise and lower the pressing foot 1423 and to vary the amount of pressure applied by the pressing foot 1423 to, for instance, the top plate of the jig 1410. The pressing foot 1423 may be generally rectangular or ovoid in shape and is adapted to contact the top plate of the jig 1410 and apply pressure to the top plate while, for example, the side surface of the shoe sole portion 1411 is painted by the painting nozzle 1414. The jig pressing unit 1422 may be programmable and controlled by one or more of the computing devices associated with the painting station 1310. The jig pressing unit 1422 may be programmed to apply a certain amount of pressure to the top plate of the jig 1410 based on information received from, for example, a scanner concerning the style, model, and/or size of the shoe sole portion 1411 that is to be painted and/or the particular jig used to secure the shoe sole portion 1411. The application of pressure to the top plate of the jig 1410 may help to eliminate any gaps between the top plate and the shoe sole portion 1411 and between the bottom plate of the jig 1410 and the shoe sole portion 1411. The result is that the upper and lower surfaces of the shoe sole portion 1411 are completely covered by the top and bottom plates of the jig 1410 such that, in one exemplary aspect, only the side surface of the shoe sole portion 1411 is left exposed for painting. Additionally, as explained above with respect to FIGS. 10-12, the application of differing amounts of pressure to the top plate of the jig 1410 may cause deforming layers of the jig 1410 to overlap the side surface of the shoe sole portion 1411 a predetermined amount and to create configurable masking lines on the side surface of the shoe sole portion 1411.

The staging area 1424 may comprise an area where the jig 1410 is positioned prior to entering the painting station 1310. The staging area 1424 may comprise one or more sensors for detecting availability of the painting station 1310. Once it is detected that the painting station 1310 is available, a pusher associated with the transport assembly 1316 pushes the jig 1410 into the painting station 1310.

Prior to entering the staging area 1424, the jig 1410 is loaded via an automated and/or manual process with the unpainted shoe sole portion 1411; the unpainted shoe sole portion 1411 has a certain style and/or falls within a defined size range. Additionally, prior to entering the staging area 1424, the jig 1410 with the loaded shoe sole portion 1411 may be scanned by, for example, a scanner, such as a RFID (radio-frequency identification) scanner, to identify the shoe sole portion style, size, whether the shoe sole portion 1411 is configured for a left foot or a right foot, and the like. This information may be communicated to downstream components and/or stations and used to program, for example, components associated with the stations such as, for example, the 6-axis robot 1416 associated with the painting station 1310.

The sensors associated with the painting station 1310 may be used to detect that the jig 1410 is in position and ready for the painting process. In the illustrated aspect, the jig 1410 is in a position for the painting process when it is vertically aligned under the jig pressing unit 1422 with the pivotable connection or toe-maintaining end of the jig 1410 facing away from the resting 6-axis robot 1416, and the heel-maintaining end of the jig 1410 (e.g., the end with the open-assist mechanism) facing the resting 6-axis robot 1416. Positioning the loaded jig 1410 in such a manner orients the toe region of the shoe sole portion 1411 away from the 6-axis robot 1416, and the heel region of the shoe sole portion 1411 facing towards the 6-axis robot 1416. Other ways of positioning the jig 1410 for the painting process are contemplated as being within the scope contemplated herein. The sensors may be programmably coupled with other components of the painting station 1310 such as, for example, the 6-axis robot 1416 and the jig pressing unit 1422. Once the sensors detect that the jig 1410 is in position, the sensors may communicate this information to the jig pressing unit 1422 which then applies a predetermined amount pressure to the top plate of the jig 1410 via the pressing foot 1423. Additionally, the sensors may communicate this information to the 6-axis robot 1416. The 6-axis robot may then begin the painting process after the jig pressing unit 1422 is in position and is applying pressure to the top plate of the jig 1410.

Figure 15:
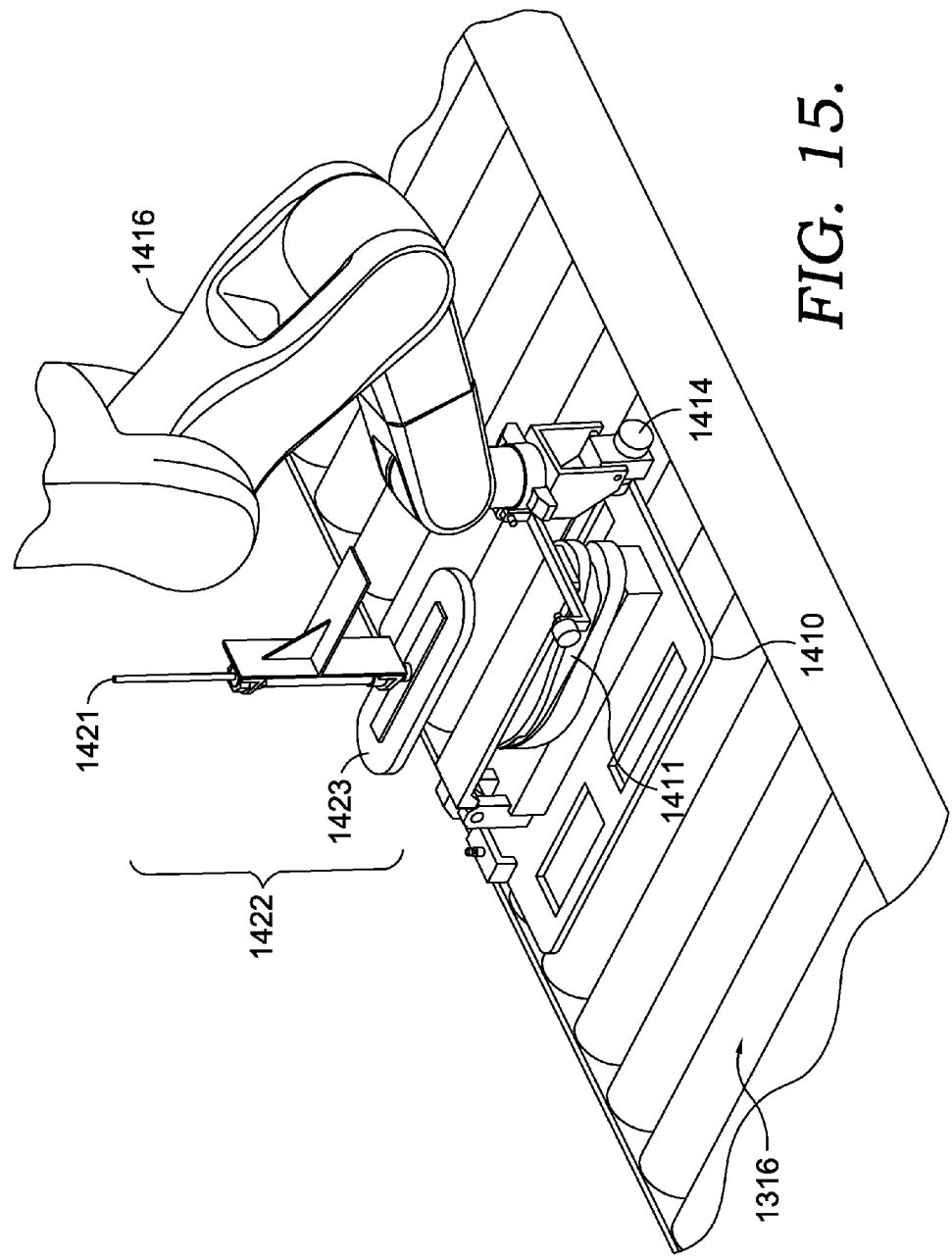
FIG. 15 illustrates an exemplary jig pressing unit, a jig securing a shoe sole portion, and an exemplary robotic painting assembly in accordance with aspects hereof.

FIG. 15 depicts a close-up view of the loaded jig 1410 once it has been positioned in the painting station 1310 by the transport assembly 1316 but prior to the shoe sole portion 1411 being painted. FIG. 15 illustrates the 6-axis robot 1416 with its attached painting nozzle 1414 in a resting position. The 6-axis robot 1416 may be secured to a ceiling or side surface of the painting station 1310. FIG. 15 further illustrates the jig pressing unit 1422 in a resting position. The jig pressing unit 1422 may be secured to, for example, a ceiling or a side surface of the painting station 1310. As described above, the jig 1410 is positioned for the painting process when the top plate of the jig 1410 is vertically aligned below the pressing foot 1423 of the jig pressing unit 1422, and the pivotable connection between the top and bottom plates of the jig 1410 is on a side opposite of the painting nozzle 1414. As mentioned above, this position of the jig 1410 places the heel region of the shoe sole portion 1411 facing towards the resting 6-axis robot 1416 and the toe region of the shoe sole portion 1411 facing away from the resting 6-axis robot 1416.

Figure 16:
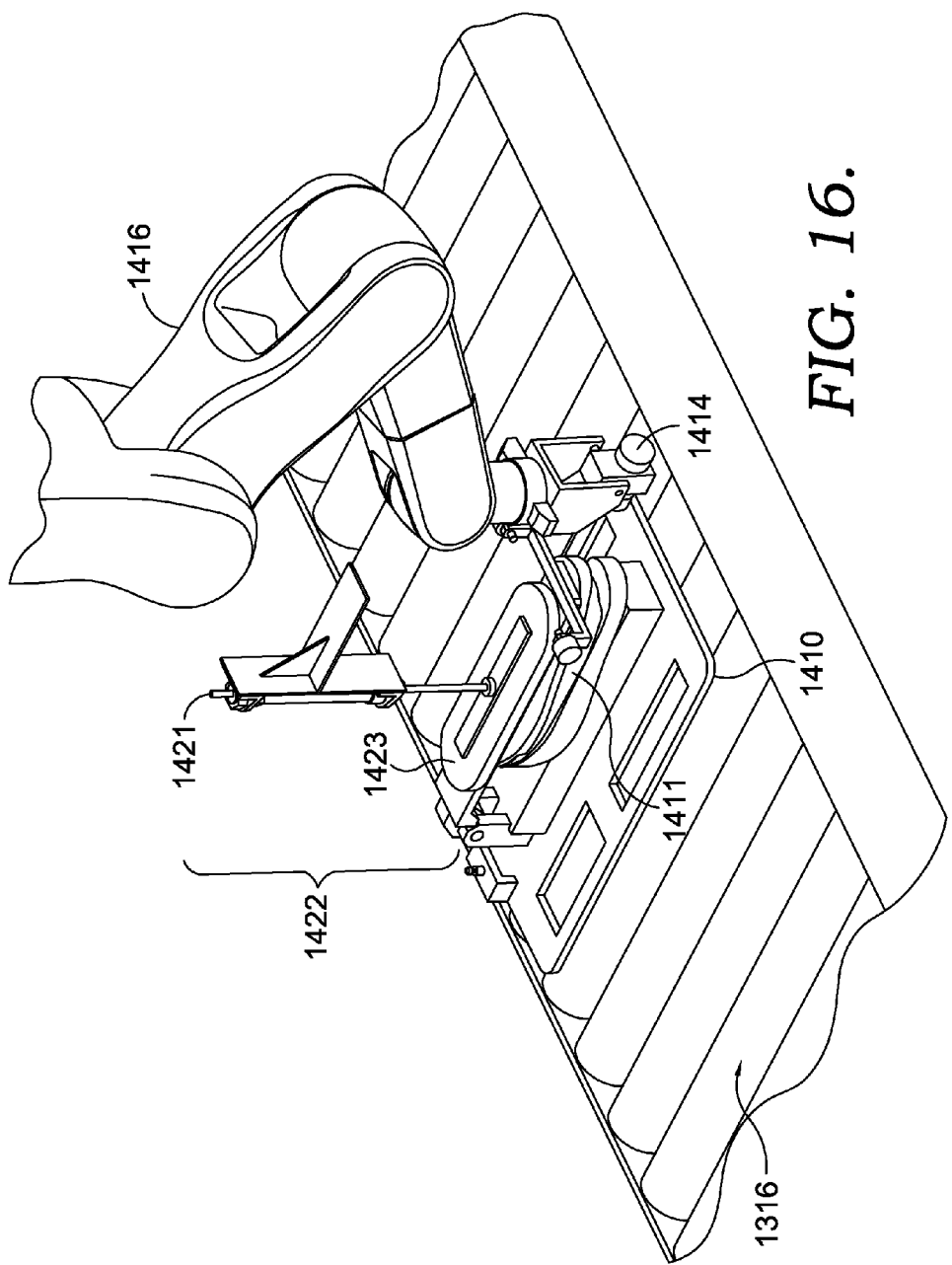
FIG. 16 illustrates the exemplary jig pressing unit of FIG. 15 applying pressure to a top plate of the jig securing the shoe sole portion in accordance with aspects hereof.

FIG. 16 depicts the same scene as FIG. 15 at a slightly later point in time. FIG. 16 illustrates the jig pressing unit 1422 applying a predetermined amount of pressure to the top plate of the jig 1410 prior to the painting process being initiated. Specifically, upon receipt of information from the sensors that the jig 1410 with the unpainted shoe sole portion 1411 is in position, the actuator 1421 lowers the pressing foot 1423 on to the top plate of the jig 1410 and applies the predetermined amount of pressure to the top plate of the jig 1410. The pressure is maintained until the painting process is completed.

Figure 17:
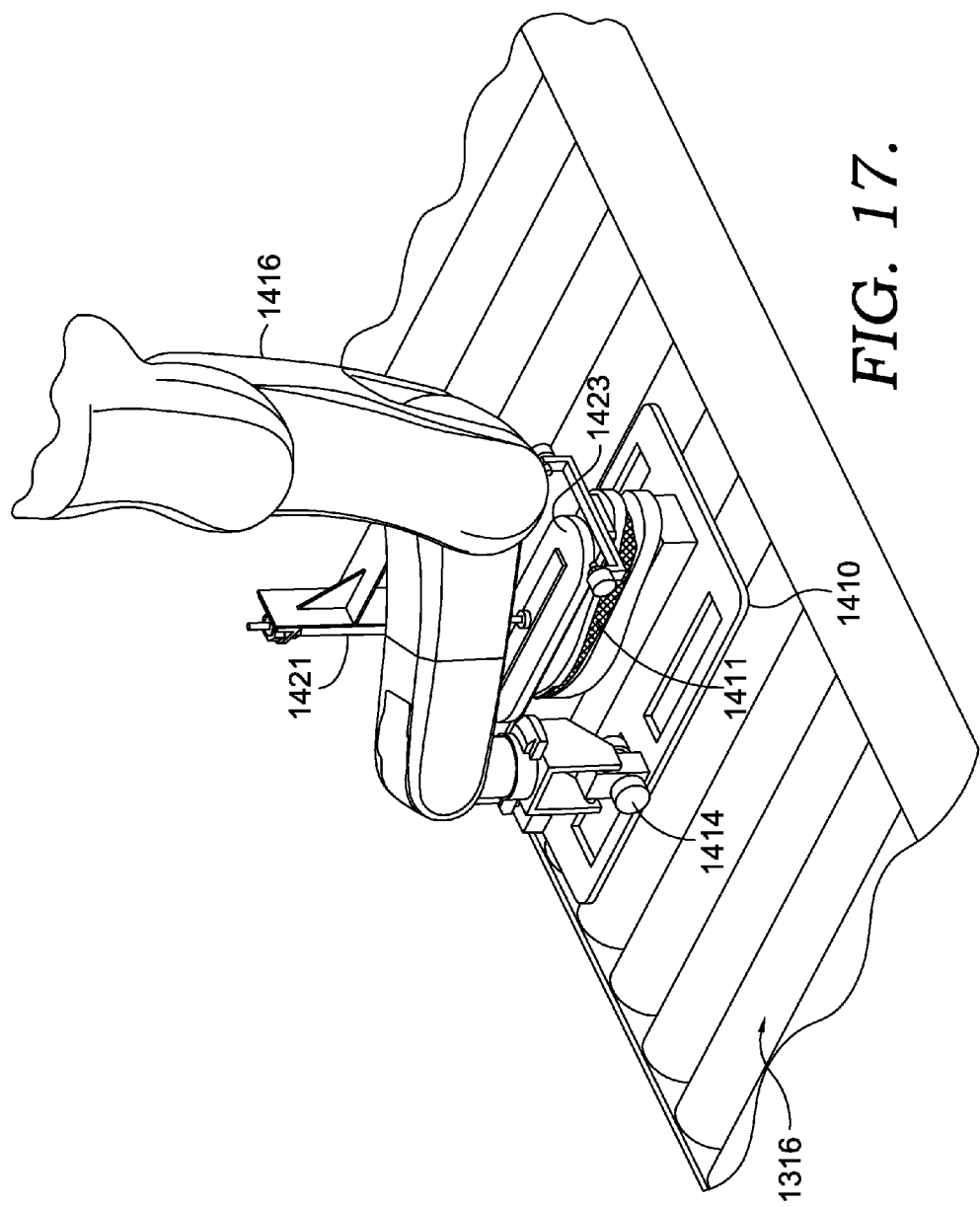
FIG. 17 illustrates the exemplary robotic arm of FIG. 15 painting a side surface of the shoe sole portion in accordance with aspects hereof.

FIG. 17 depicts the same scene as FIG. 16 at a still later point in time. FIG. 17 illustrates the 6-axis robot 1416 automatically positioning the painting nozzle 1414 so that the painting nozzle 1414 applies paint in a predetermined pattern to the side surface of the shoe sole portion 1411 while pressure is applied to the top plate of the jig 1410 by the pressing foot 1423. The painting pattern followed by the 6-axis robot 1416 may be dependent upon the style and/or size of the shoe sole portion 1411 as communicated to the painting station 1310 by upstream scanners. Additionally, or alternatively, the painting pattern followed by the 6-axis robot 1416 may be dependent upon the characteristics of the particular jig used to secure the shoe sole portion 1411. The painting nozzle 1414, via the 6-axis robot 1416, may, in one aspect, apply paint to a medial side, a lateral side, and a heel region of the shoe sole portion 1411. It is further contemplated that depending on the configuration of the jig 1410 and/or the shoe sole portion 1411, the painting nozzle 1414, via the 6-axis robot 1416, may further apply paint to a toe region of the shoe sole portion 1411. Any and all such aspects, and any variation thereof, are contemplated as being within the scope contemplated herein.

Figure 18:
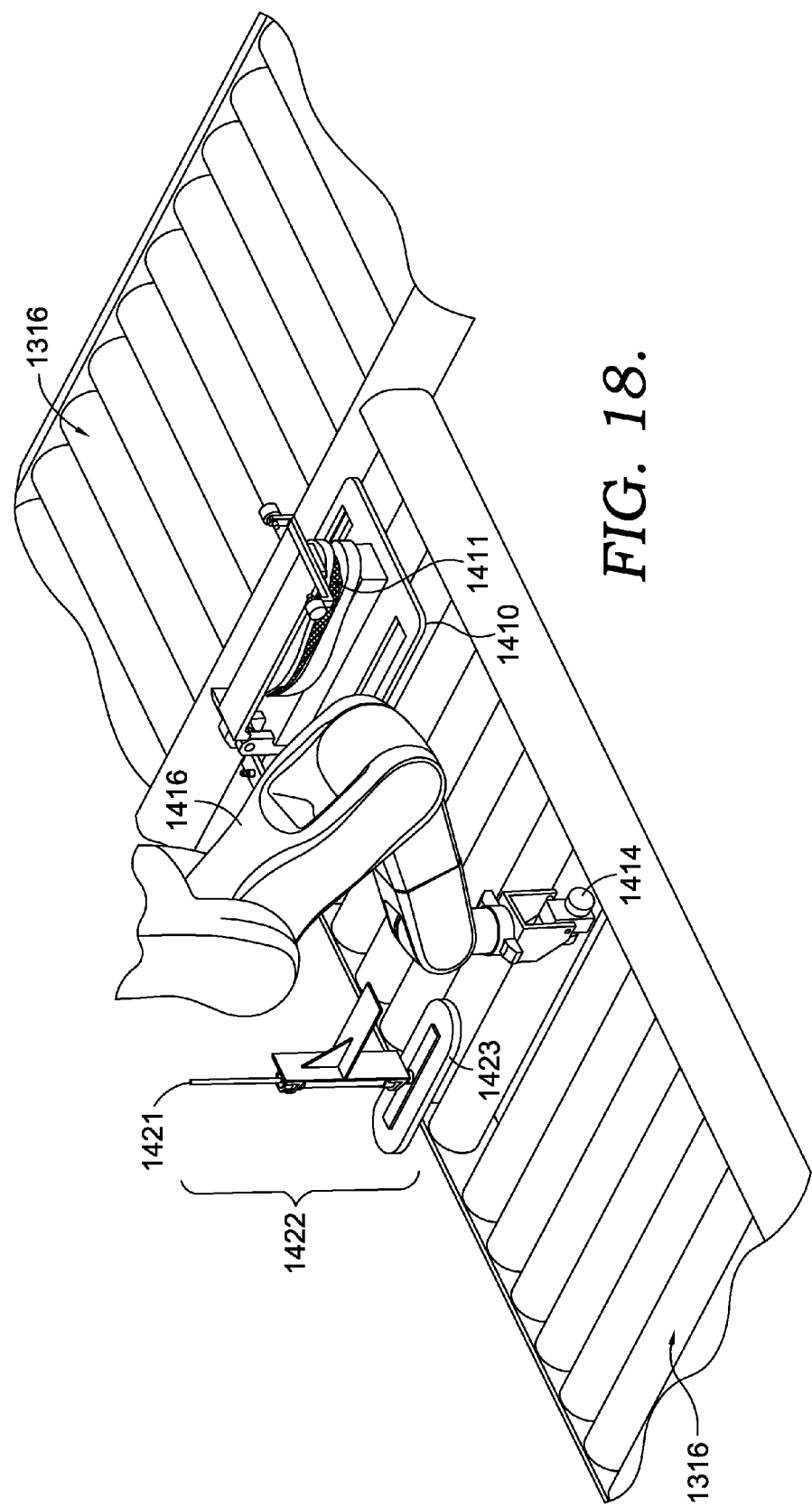
FIG. 18 illustrates the jig of FIG. 17 leaving the painting station of FIG. 14 in accordance with aspects hereof.

FIG. 18 depicts the same scene as FIG. 17 at a still later point in time after the side surface of the shoe sole portion 1411 has been painted by the painting nozzle 1414. The jig 1410 is shown being transported by the transport assembly 1316 to a perpendicularly-oriented transport assembly 1316 that will take the jig 1410 to the opening station 1312. In one aspect, a pusher associated with the transport assembly 1316 may push the jig 1410 onto the perpendicularly-oriented transport assembly 1316 for transport to the opening station 1312. The jig 1410, upon being transferred to the perpendicularly-oriented transport assembly 1316, is positioned such that the open-assist mechanism of the top plate of the jig 1410 will arrive at the opening station 1312 first, and the pivotable connection between the top and bottom plates of the jig 1410 will arrive last. Stated differently, the direction of movement of the jig 1410 needs to be longitudinal in orientation to facilitate opening by an opening mechanism associated with the opening station 1312; therefor, a perpendicular transport is contemplated. However, the jig 1410 may also be rotated 90 degrees on the same transport assembly 1316 to achieve a similar result, in an exemplary aspect.

Continuing with FIG. 18, the 6-axis robot 1416 is shown in the resting position in FIG. 18. Subsequent to painting the shoe sole portion 1411 and prior to returning to its resting position, the 6-axis robot 1416 may move the painting nozzle 1414 to the nozzle cleaning unit 1418 of FIG. 14 in order to clean the painting nozzle 1414. FIG. 18 also depicts the jig pressing unit 1422 in a resting position subsequent to the pressing foot 1423 being removed from the top plate of the jig 1410 by the actuator 1421.

Figure 19:
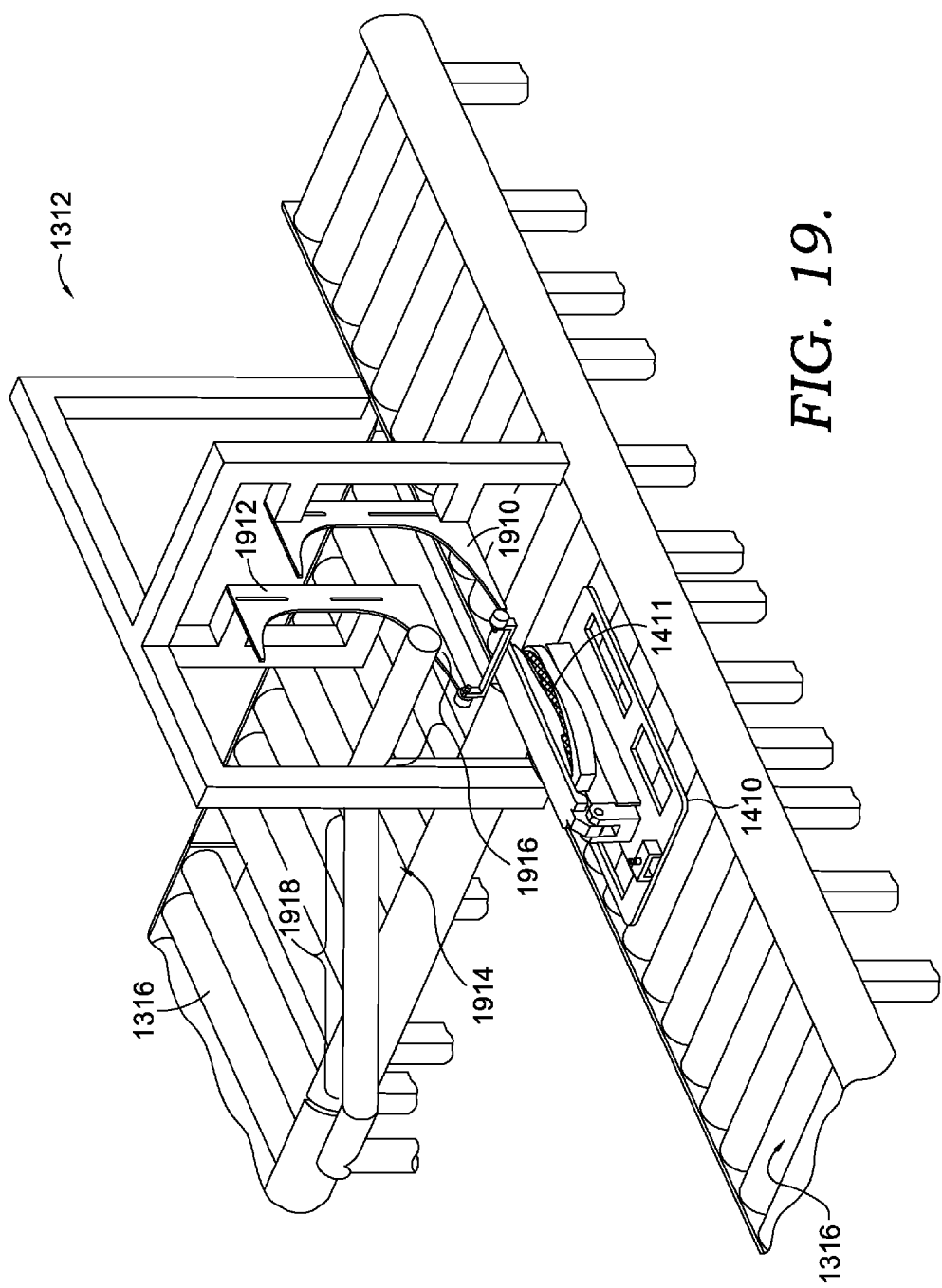
FIG. 19 illustrates an exemplary overview of an opening station of a shoe sole portion painting system in accordance with aspects hereof.

Turning now to FIGS. 19-24, these figures illustrate aspects of the opening station 1312 including the jig 1410 with the painted shoe sole portion 1411 being transitioned from the closed position to a fully-open position by interaction with an opening mechanism associated with the opening station 1312. FIG. 19 depicts an exemplary overview of the opening station 1312 with the top plate of the jig 1410 beginning to engage guide plates of the opening mechanism. The opening mechanism of the opening station 1312 may comprise a first guide plate 1910, a second guide plate 1912, and a slide rail 1914. The first guide plate 1910 and the second guide plate 1912 may both be oriented in a direction substantially parallel to the transport assembly 1316 that is transporting the jig 1410 from the painting station 1310 to the opening station 1312. As such, the first guide plate 1910 and the second guide plate 1912 are oriented in parallel planes to each other. The first and second guide plates 1910 and 1912 are adapted to transition the top plate of the jig 1410 from the closed position to an at least partially-open position by translating the forward movement of the jig 1410 created by the transport assembly 1316 into an opening force that causes the top plate to pivot open via the pivotable connection between the top plate and the bottom plate of the jig 1410.

In an additional aspect, it is contemplated that the opening mechanism of the opening station 1312 may comprise a first guide plate 1910 and a second guide plate 1912. The first guide plate 1910 and the second guide plate 1912 are oriented in a direction substantially parallel to the transport assembly 1316 that is transporting the jig 1410 from the painting station 1310 to the opening station 1312. As such, the first guide plate 1910 and the second guide plate 1912 are oriented in parallel planes to each other. The first and second guide plates 1910 and 1912 are adapted to transition the top plate of the jig 1410 from the closed position to an at least partially-open position by translating the forward movement of the jig 1410 created by the transport assembly 1316 into an opening force that causes the top plate to pivot open via the pivotable connection between the top plate and the bottom plate of the jig 1410.

Figure 20:
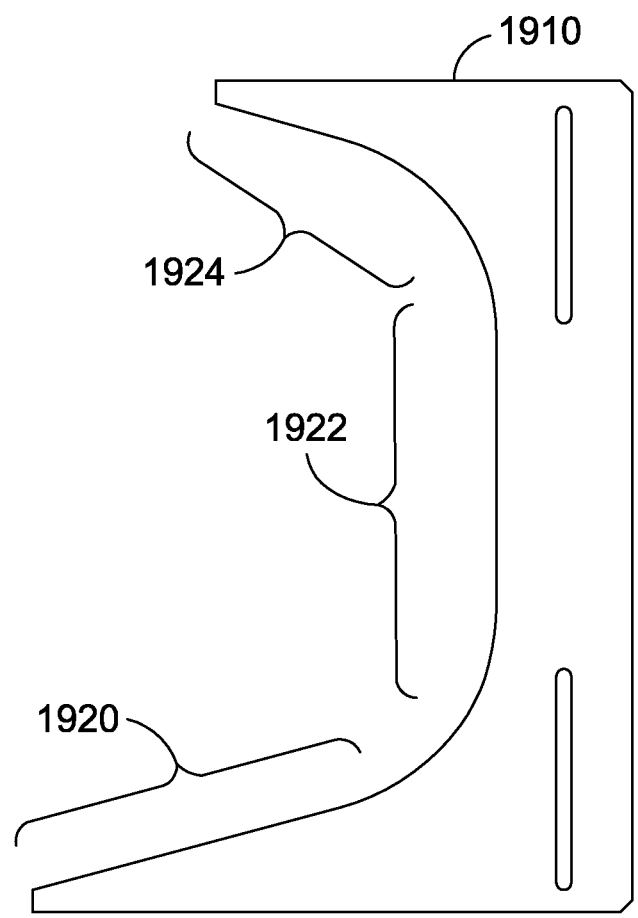
FIG. 20 illustrates an exemplary side elevation view of a guide plate of the opening station of FIG. 19 in accordance with aspects hereof.

FIG. 20 depicts a side view of the first guide plate 1910. The discussion of the first guide plate 1910 is equally applicable to the second guide plate 1912. As seen in FIG. 20, the first guide plate 1910 may have a reverse generally C-shaped curvature and comprise a continuous first portion 1920, a second portion 1922, and a third portion 1924. The first portion 1920 may be adapted to engage an open-assist mechanism of the jig 1410 such as the open-assist mechanism 426 of FIGS. 4-8 as the transport assembly 1316 moves the jig 1410 longitudinally towards the first guide plate 1910. In the illustrated aspect of FIG. 19, the first portion 1920 is adapted to engage a first vertical portion of the open-assist mechanism, such as the first vertical portion 810 of FIG. 8. More specifically, the first portion 1920 of the first guide plate 1910 may be adapted to engage a roller knob, such as the roller knob 816 of FIG. 8, affixed to a terminal end of the first vertical portion. In another aspect, the first portion 1920 may be adapted to engage a first member of a horizontal portion of the open-assist mechanism such as the first member 815 of the horizontal portion 814 of FIG. 8. Any and all such aspects, and any variation thereof, are contemplated as being within the scope contemplated herein.

The second portion 1922 of the first guide plate 1910 slants upward in a generally vertical direction and is adapted to retain the engagement of open-assist mechanism of the jig 1410 and to transition the top plate of the jig 1410, via the pivotable connection between the top plate and the bottom plate of the jig 1410, from the closed position to a partially-open position as the transport assembly 1316 continues to move the jig 1410 longitudinally along the transport assembly 1316.

The third portion 1924 of the first guide plate 1910 may comprise the upper-arm of the "C" shape. The third portion 1924 of the first guide plate 1910 is adapted to release the first vertical portion or the first member of the open-assist mechanism as the jig 1410 continues its longitudinal movement along the transport assembly 1316. When the top plate of the jig 1410 is released from the third portion 1924, the top plate may still be in a partially-open position.

The size and shape of the first portion 1920, the second portion 1922, and the third portion 1924 may be adapted to the size of the jig 1410. For example, a length extending from the pivotal connection of the jig 1410 to the open-assist mechanism of the jig 1410 may define, at least in part, one or more curves used in the guide plates 1910 and 1912. Stated differently, it is contemplated that a length extending from the pivotal connection of the jig 1410 to an engagement portion of the jig 1410 may determine the size and shape of the portions 1920, 1922, and 1924 of the guide plates 1910 and 1912 to allow a fluid opening that is not mechanically binding on the jig 1410.

Returning to FIG. 19, the slide rail 1914 is oriented perpendicular to the planes of the first and second guide plates 1910 and 1912 and may be operatively coupled to at least a portion of the first and second guide plates 1910 and 1912. More specifically, the slide rail 1914 may comprise a first horizontal portion 1916 and a second slanted-angle portion 1918 that angles downwardly from the first horizontal portion 1916. The first horizontal portion 1916 may be operatively coupled to at least the second guide plate 1912. The first horizontal portion 1916 of the slide rail 1914 is positioned before the second guide plate 1912 when viewed from the perspective of the jig 1410 moving along the transport assembly 1316 from the painting station 1310 to the opening station 1312. Stated differently, a terminal or distal end of the first horizontal portion 1916 may extend into a location between planes defined by the first guide plate 1910 and the second guide plate 1912 to facilitate transition from the guide plates 1910 and 1912 to the first horizontal portion 1916. Additionally, the first horizontal portion 1916 is positioned at a height above the transport assembly 1316 such that the closed jig 1410 with its open-assist mechanism can freely pass under the first horizontal portion 1916 prior to the open-assist mechanism engaging the first portion 1920 of the guide plates 1910 and 1912, in an exemplary aspect.

The first horizontal portion 1916 of the slide rail 1914 may be adapted to receive the top plate of the jig 1410 after the top plate is released from the third portion 1924 of the first and second guide plates 1910 and 1912. When received by the first horizontal portion 1916, the top plate of the jig 1410 may still be in a partially-open position. The second slanted-angle portion 1918 of the slide rail 1914 receives the top plate of the jig 1410 from the first horizontal portion 1916 after the jig 1410 is transferred from the transport assembly 1316 connecting the painting station 1310 to the opening station 1312 to the perpendicularly-oriented transport assembly 1316 connecting the opening station 1312 to the unloading station 1314. Transfer of the jig 1410 to the perpendicularly-oriented transport assembly 1316 connecting the opening station 1312 to the unloading station 1314 may occur via one or more pushers associated with the transport assembly 1316. As the jig 1410 is transported by the transport assembly 1316 to the unloading station 1314, the top plate travels down the second slanted-angle portion 1918 and is transitioned to a fully-open configuration. In the depicted example, a first direction of movement by the jig 1410 is translated by the guide plates 1910 and 1912 into a partial opening of the jig 1410, and a second perpendicular direction of travel by the jig 1410 is further translated into a final opening of the jig 1410 by the slide rail 1914.

Figure 21:
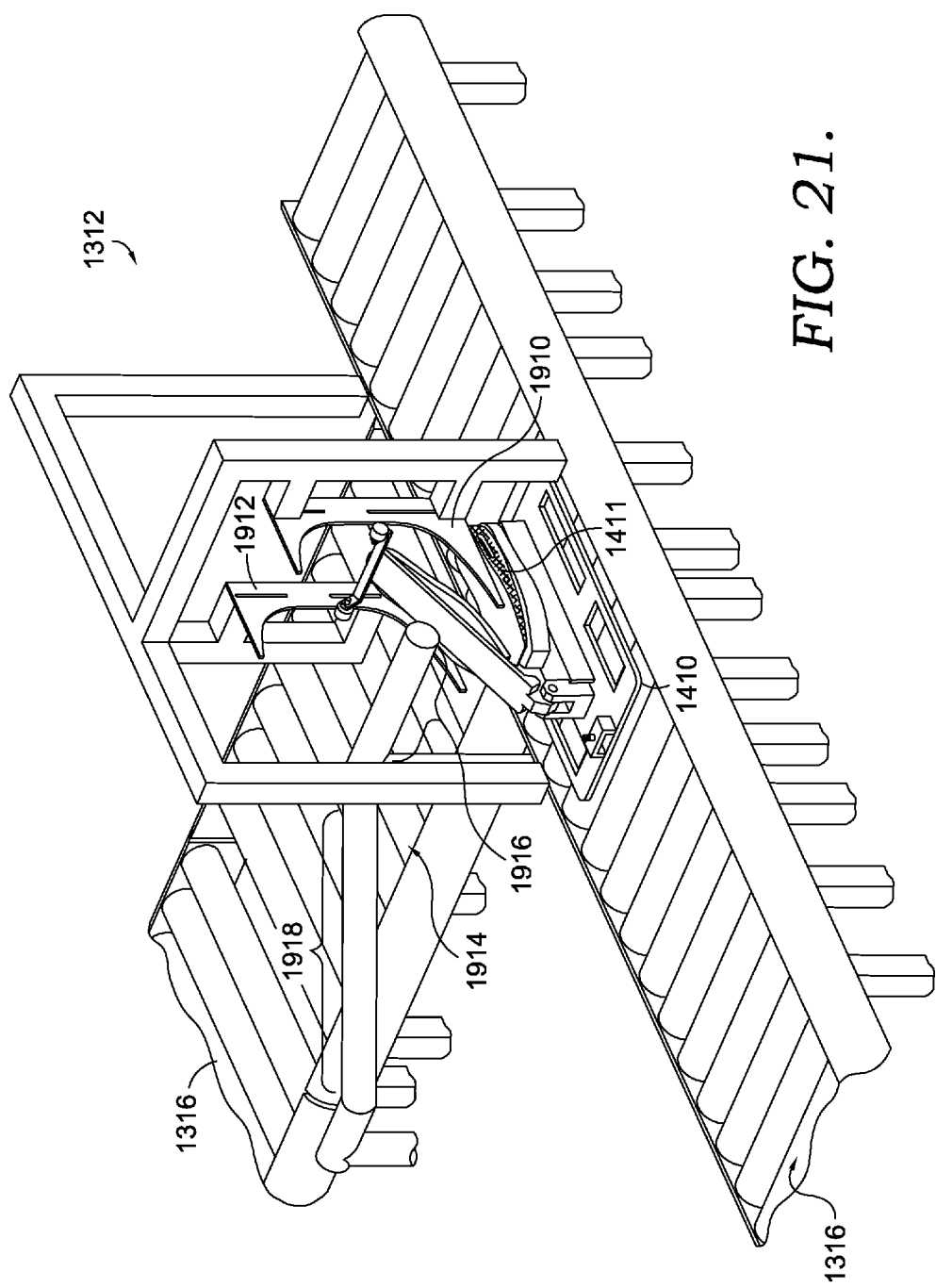
FIG. 21 illustrates an exemplary perspective view of a top plate of a jig being transitioned to a partially-open state via interaction with guide plates of the opening station of FIG. 19 in accordance with aspects hereof.
Figure 22:
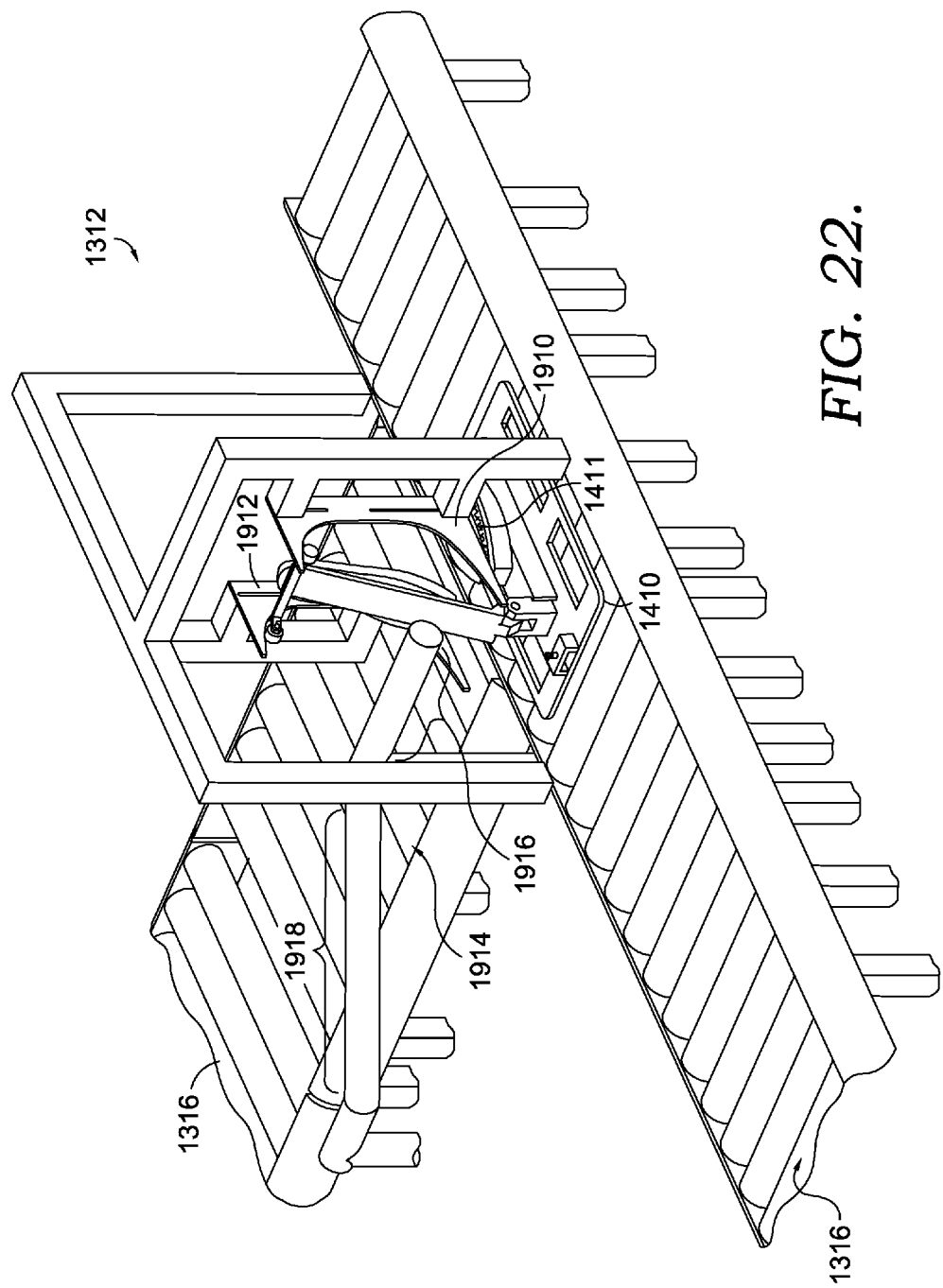
FIG. 22 illustrates an exemplary perspective view of the top plate of the jig prior to being released from the guide plates of the opening station of FIG. 19 in accordance with aspects hereof.

FIG. 21 depicts a view of the jig 1410 when the jig's open-assist mechanism is engaged with the second portion 1922 of the first and second guide plates 1910 and 1912. As seen, the jig 1410 has been transitioned from the closed position to a partially-open position as the jig 1410 has been moved longitudinally along the transport assembly 1316. FIG. 22 depicts a view of the jig 1410 when the jig's open-assist mechanism is engaged with the third portion 1924 of the first and second guide plates 1910 and 1912 just prior to the top plate being released from the third portion 1924. Though still not fully open, the top plate of the jig 1410 has been pivoted open to a greater degree than when the top plate was engaged with the second portion 1922 of the first and second guide plates 1910 and 1912.

Figure 23:
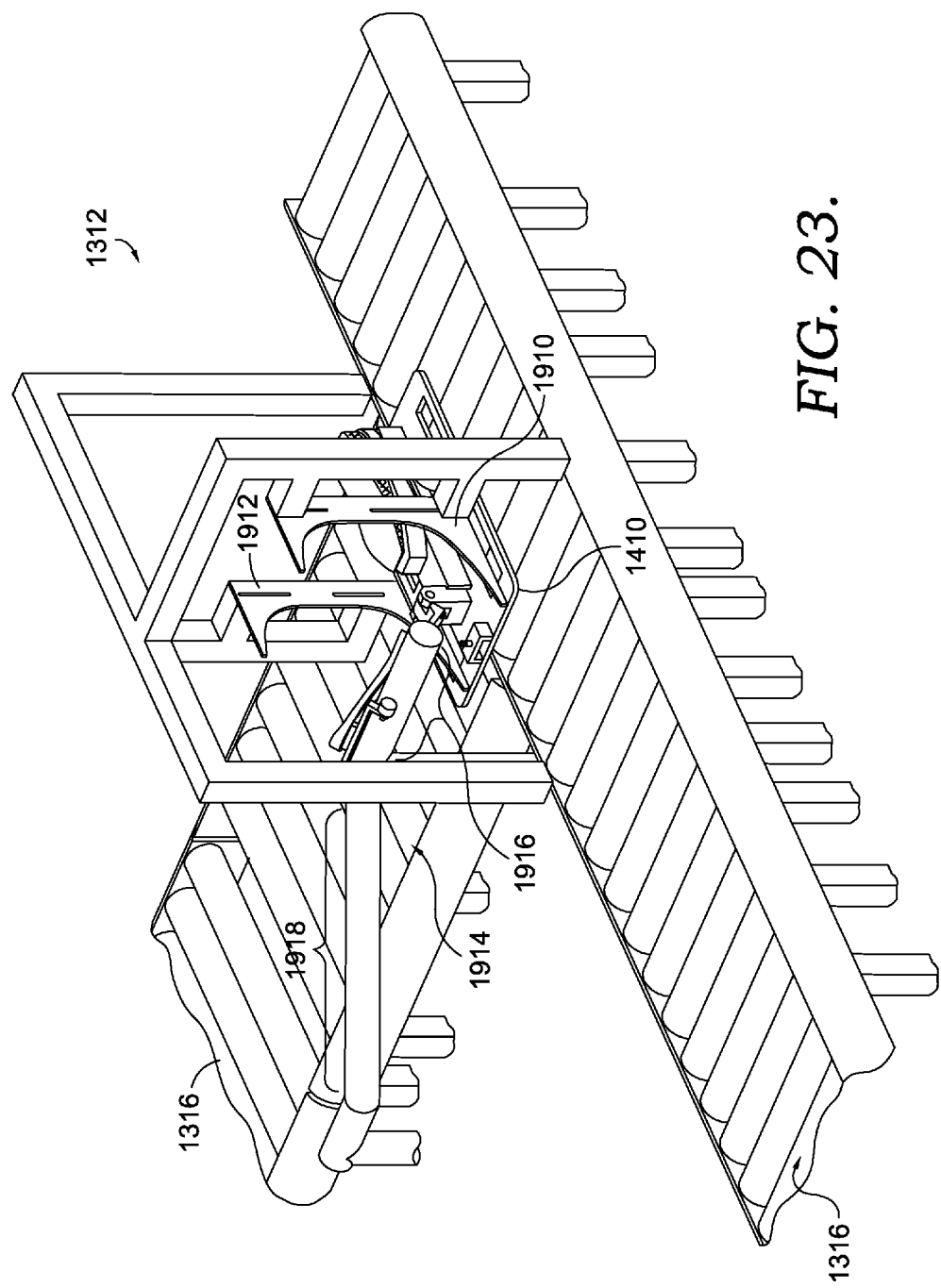
FIG. 23 illustrates an exemplary perspective view of the top plate of the jig being received by a horizontal portion of a slide rail of the opening station of FIG. 19 in accordance with aspects hereof.

FIG. 23 depicts the top plate of the jig 1410 after it has been released by the third portion 1924 of the first and second guide plates 1910 and 1912 and received by the first horizontal portion 1916 of the slide rail 1914. When received by the first horizontal portion 1916, the jig 1410 is still in a partially-open configuration. The top plate of the jig 1410 remains engaged with the first horizontal portion 1916 until the jig 1410 is moved to the perpendicularly-oriented transport assembly 1316 connecting the opening station 1312 to the unloading station 1314.

Figure 24:
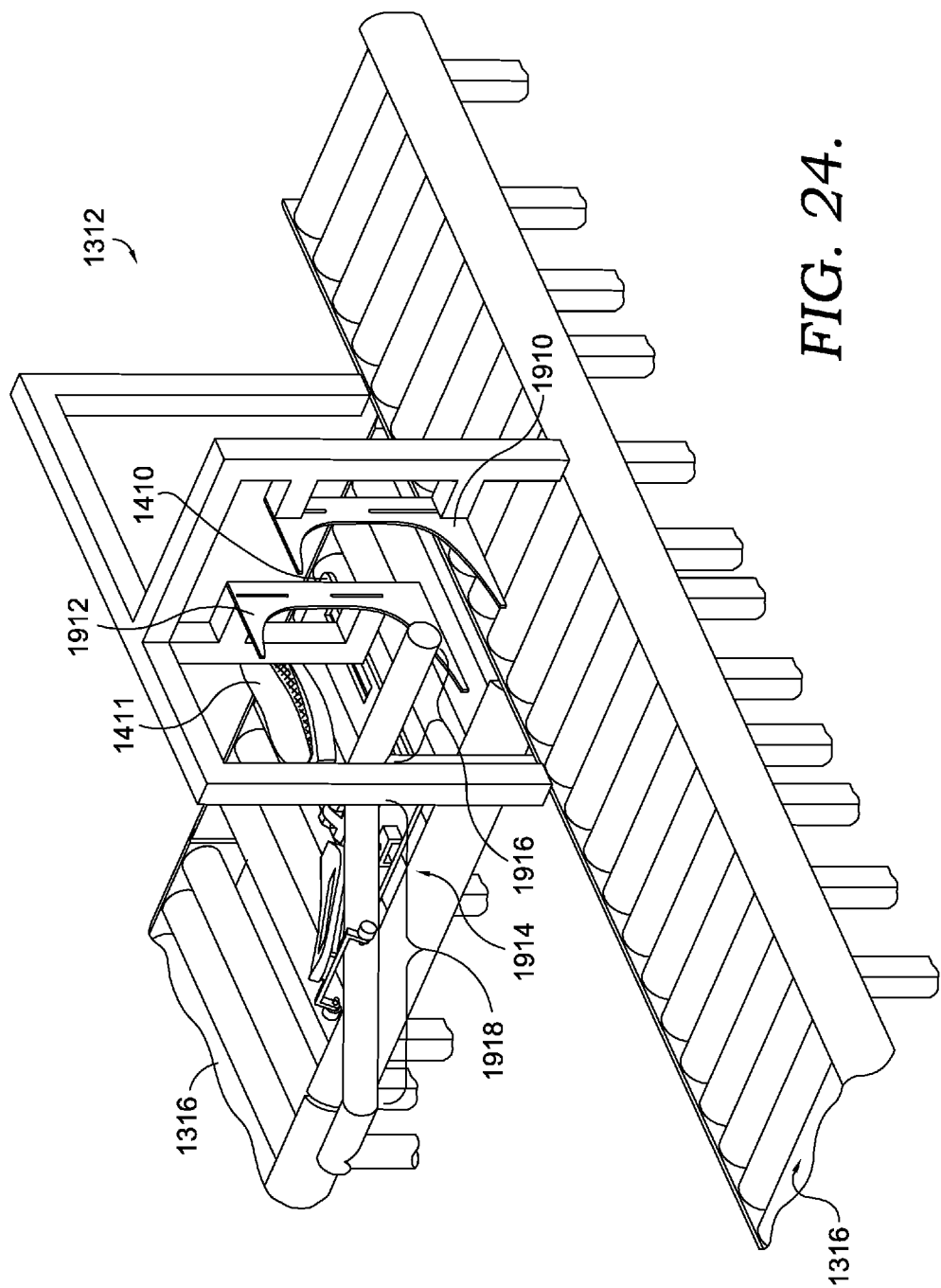
FIG. 24 illustrates an exemplary perspective view of the top plate of the jig in contact with a slanted-angle portion of the slide rail of the opening station of FIG. 19 in accordance with aspects hereof.

FIG. 24 depicts the top plate of the jig 1410 engaged with the second slanted-angle portion 1918 of the slide rail 1914. As the transport assembly 1316 moves the jig 1410 longitudinally towards the unloading station 1314, the top plate of the jig 1410 slides down the second slanted-angle portion 1918 and is transitioned to a fully-open configuration. Smoothly transitioning the jig 1410 to a fully-open configuration using the guide plates 1910 and 1912 in combination with the slide rail 1914, prevents excessive wear-and-tear on the jig 1410 and prolongs the useable life of the jig 1410.

Figure 25:
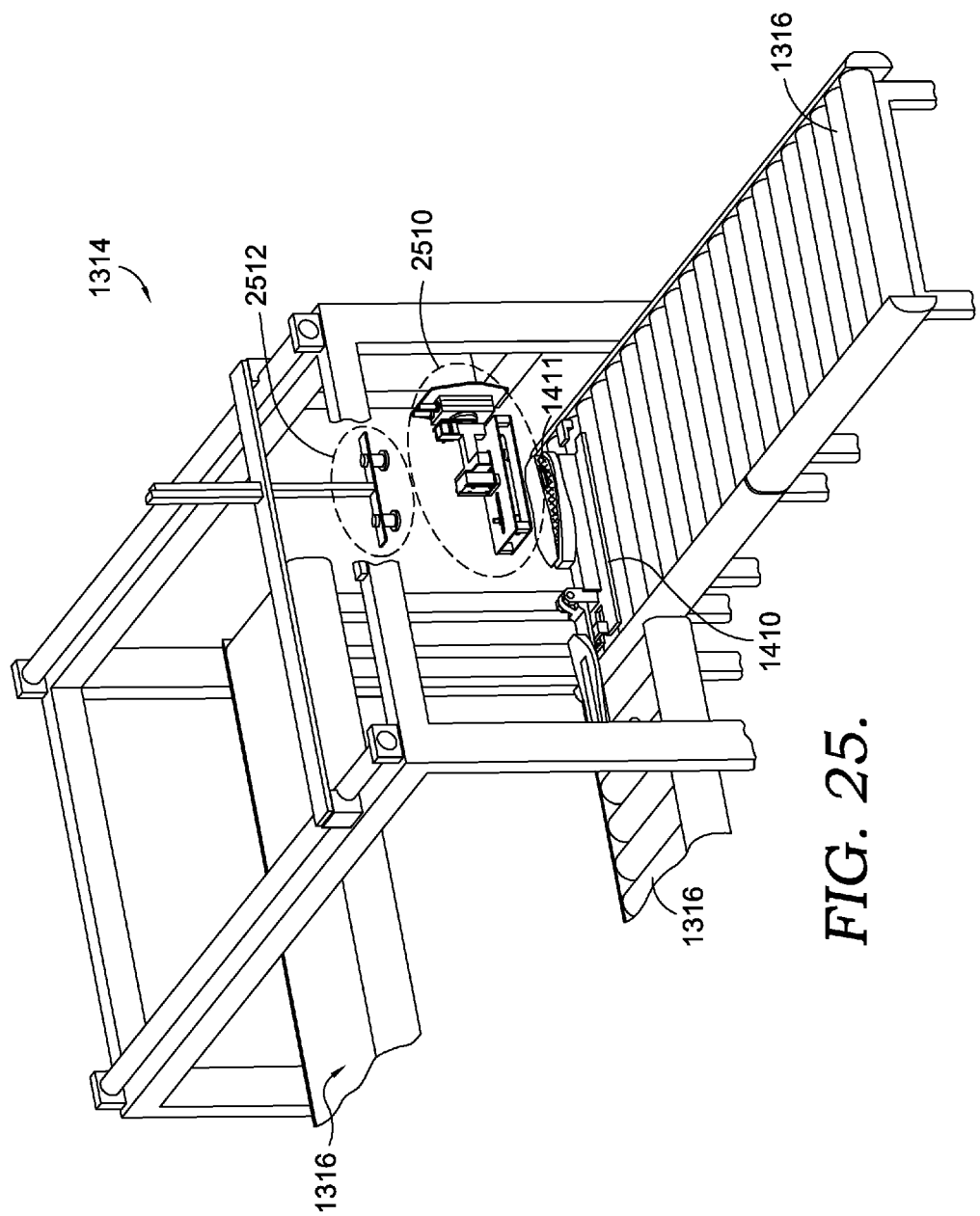
FIG. 25 illustrates an exemplary overview of an unloading station of shoe sole portion painting system in accordance with aspects hereof.

Turning now to FIGS. 25-28, these figures illustrate aspects of the unloading station 1314 including the interaction between the shoe sole portion 1411, a first pick-and-place unit, and a second pick-and-place unit. FIG. 25 depicts an exemplary overview of the unloading station 1314. The unloading station 1314 may comprise in one aspect a first pick-and-place unit 2510 and a second pick-and-place unit 2512 as well as, optionally, the transport assembly 1316 and the fully-open jig 1410 carrying the painted shoe sole portion 1411. In another aspect, the unloading station 1314 may comprise just the first pick-and-place unit 2510 as well as, optionally, the transport assembly 1316 and the fully-open jig 1410 carrying the painted shoe sole portion 1411. The unloading station 1314 may additionally comprise one or more sensors for detecting when the jig 1410 is correctly positioned with respect to the first pick-and-place unit 2510 and/or the second pick-and-place unit 2512 and one or more computing devices for coordinating the interaction between the first pick-and-place unit 2510, the second pick-and-place unit 2512, and the jig 1410. As seen in FIG. 25, the first pick-and-place unit 2510 is positioned vertically below the second pick-and-place unit 2512 when the units 2510 and 2512 are in a resting position.

Figure 26:
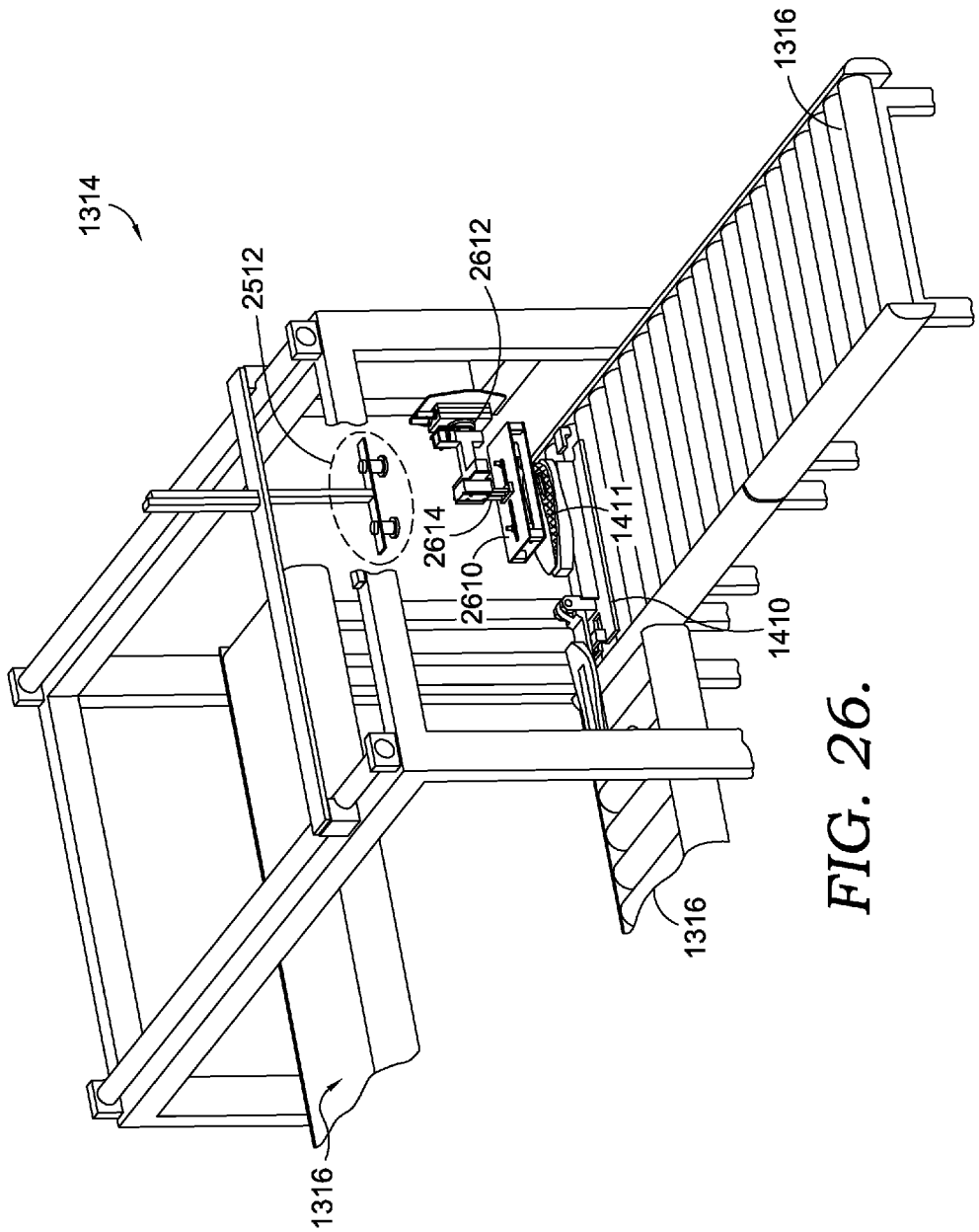
FIG. 26 illustrates an exemplary first pick-and-place unit removing a shoe sole portion from a jig in accordance with aspects hereof.

Turning now to FIG. 26, a view of the first pick-and-place unit 2510 interacting with the shoe sole portion 1411 is provided. The first pick-and-place unit 2510 may be secured to a ceiling or side surface of the unloading station 1314 and may comprise a plate portion 2610, a rotating cylinder portion 2612, and an actuator 2614, such as a pneumatic cylinder. The actuator 2614 acts to raise and lower the plate portion 2610 onto, for example, the exposed upper or lower surface of the painted shoe sole portion 1411, and the rotating cylinder portion 2612 acts to invert the plate portion 2610 as explained below.

The plate portion 2610 of the first pick-and-place unit 2510 is adapted to apply a pick-up force to, for example, the exposed upper or lower surface of the painted shoe sole portion 1411 upon being brought into contact with the surface of the shoe sole portion 1411 by the actuator 2614. The pick-up force may comprise a suction force, a grasping force, a gripping force, an adhering force, an electrostatic force, and the like. The surface to which the pick-up force is applied is dependent upon how the jig 1410 is initially loaded with the unpainted shoe sole portion 1411 at the loading station. In a first aspect, the jig 1410 may initially be loaded with the unpainted shoe sole portion 1411 by positioning the upper surface of the shoe sole portion 1411 on the bottom plate of the jig 1410 (e.g., similar to what is shown in FIG. 6). With respect to the first aspect, the plate portion 2610 of the first pick-and-place unit 2510 may apply the pick-up force to the exposed lower surface of the shoe sole portion 1411 when brought into contact with the lower surface of the shoe sole portion 1411. In a second aspect, the jig 1410 may initially be loaded with the unpainted shoe sole portion 1411 by positioning the lower surface of the shoe sole portion 1411 on the bottom plate of the jig 1410. With respect to the second aspect, the plate portion 2610 of the first pick-and-place unit 2510 would apply the pick-up force to the exposed upper surface of the shoe sole portion 1411 when the plate portion 2610 comes in contact with the upper surface of the shoe sole portion 1411.

Figure 27:
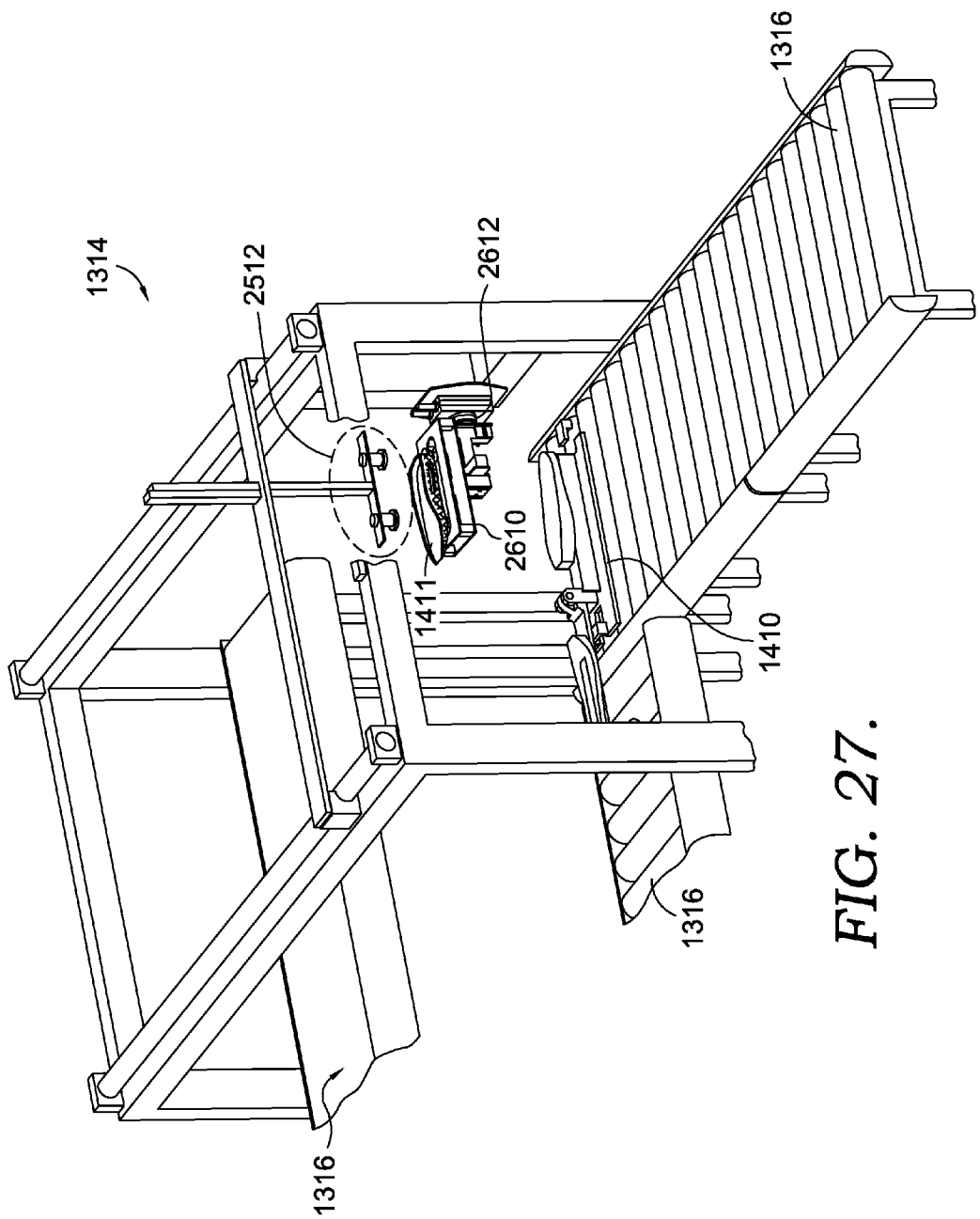
FIG. 27 illustrates the exemplary first pick-and-place unit of FIG. 26 inverting the shoe sole portion to an upright position in accordance with aspects hereof.

FIG. 27 depicts a view of the first pick-and-place unit 2510 after the plate portion 2610 has, with respect to the first aspect discussed above, picked up the shoe sole portion 1411 by applying a pick-up force to the lower surface of the shoe sole portion 1411 and been inverted by, for example, the rotating cylinder portion 2612. The inversion step may be necessary in the first aspect because inversion of the plate portion 2610 by the rotating cylinder portion 2612 acts to rotate the shoe sole portion 1411 into an upright position. This inversion step may not be necessary in the second aspect discussed above when the jig 1410 is initially loaded by positioning the lower surface of the unpainted shoe sole portion 1411 on the bottom plate of the jig 1410. In the second aspect, the shoe sole portion 1411 is already in an upright position when the plate portion 2610 applies the pick-up force to the exposed upper surface of the shoe sole portion 1411. With respect to second aspect, the first pick-and-place unit 2510 may be utilized to directly transfer the shoe sole portion 1411 to the transport assembly 1316 leading to a drying station without the assistance of the second pick-and-place unit 2512 as described below.

Figure 28:
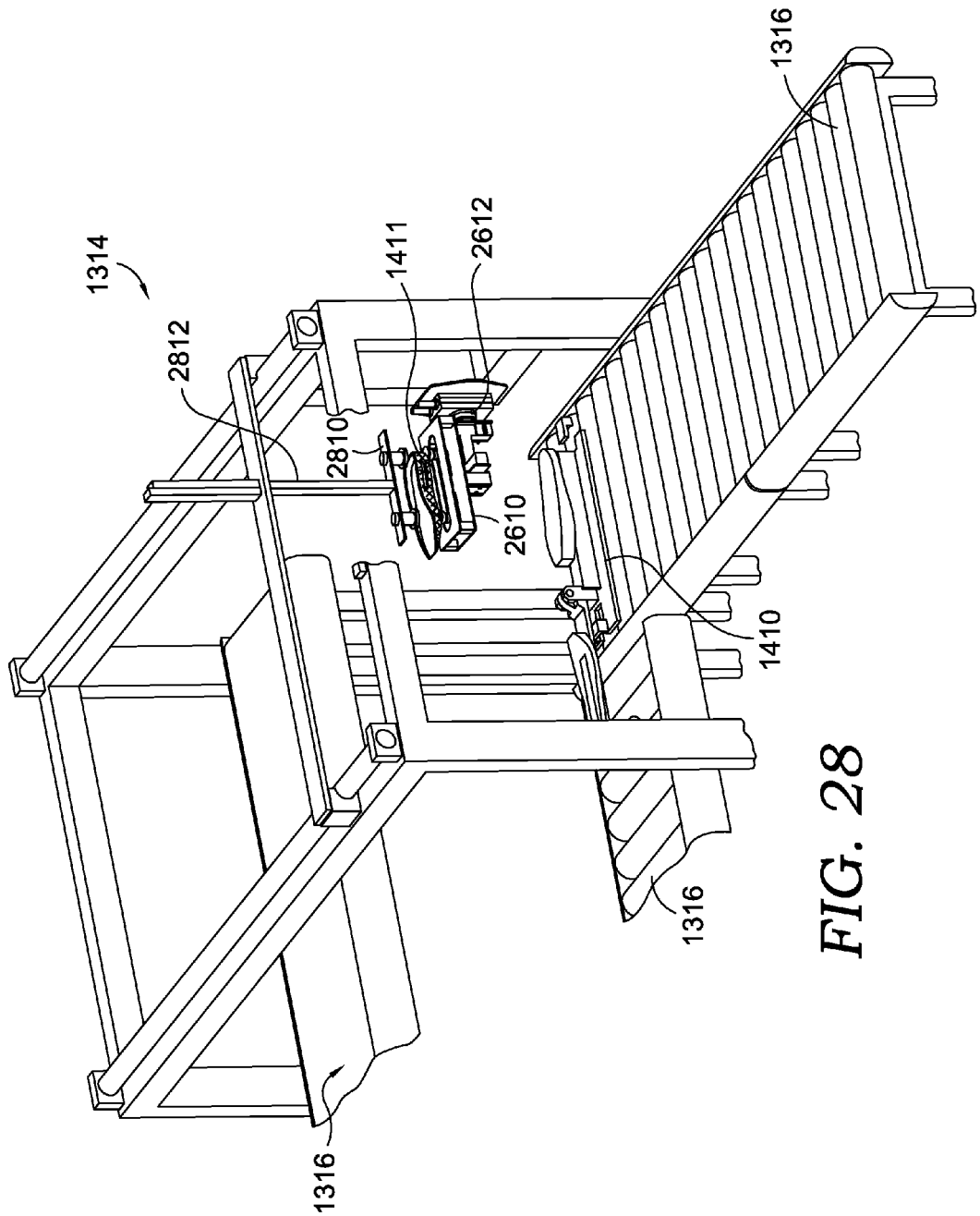
FIG. 28 illustrates an exemplary second pick-and-place unit removing the shoe sole portion from the exemplary first pick-and-place unit of FIG. 27 in accordance with aspects hereof.

FIG. 28 depicts a view of the interaction between the first pick-and-place unit 2510 and the second pick-and-place unit 2512. This interaction takes place when the plate portion 2610 applies the pick-up force to an exposed lower surface of the shoe sole portion 1411 and is inverted. The second pick-and-place unit 2512 may be secured to a ceiling and/or a side surface of the unloading station 1314 and may comprise a pick-up portion 2810 and an actuator 2812, such as a pneumatic cylinder, that acts to raise and/or lower the pick-up portion 2810. The pick-up portion 2810 is adapted to apply a pick-up force to the shoe sole portion 1411 while it is being held by the plate portion 2610 of the first pick-and-place unit 2510. The pick-up force may comprise a suction force, a grasping force, a gripping force, an adhering force, an electrostatic force, and the like.

After the plate portion 2610 of the first pick-and-place unit 2510 picks up the shoe sole portion 1411 by applying a pick-up force to the lower surface of the shoe sole portion 1411 and is inverted, the pick-up portion 2810 of the second pick-and-place unit 2512 is lowered via the actuator 2812 until the pick-up portion 2810 contacts the exposed upper surface of the shoe sole portion 1411. Once in contact with the exposed upper surface of the shoe sole portion 1411, the pick-up portion 2810 applies a pick-up force to the upper surface and removes the shoe sole portion 1411 from the plate portion 2610 of the first pick-and-place unit 2510. Once removed, the pick-up portion 2810 may transfer the shoe sole portion 1411 to the transport assembly 1316 via a guide track assembly. The transport assembly 1316 may then transport the shoe sole portion 1411 to a drying station and, optionally, to a quality control station.

The interaction between the first pick-and-place unit 2510 and the second pick-and-place unit 2512 may be coordinated by the one or more computing devices associated with the unloading station 2314. Coordinating the interaction between the units 2510 and 2512 may comprise coordinating the timing of the movements as well as when the pick-up forces are applied by the different units 2510 and 2512. For instance, once the plate portion 2610 of the first pick-and-place unit 2510 has been inverted and the pick-up portion 2810 of the second pick-and-place unit 2512 has begun to apply the pick-up force to the upper surface of the shoe sole portion 1411, the plate portion 2610 may be programmed to cease applying a pick-up force so that the shoe sole portion 1411 can more easily be removed from the plate portion 2610.

As mentioned, once the painted shoe sole portion 1411 is removed from the jig 1410 by, for example, the first pick-and-place unit 2510 and/or the second pick-and-place unit 2512, it is positioned onto the transport assembly 1316 in an upright position and transported to a drying station where the painted shoe sole portion 1411 is dried through the application of, for example, hot air and/or the application of one or more medium-wave Infra-red lamps (MIR lamps). Drying the shoe sole portion 1411 in an upright position is important for maintaining the integrity of the painted side surface of the shoe sole portion 1411. The speed of the transport assembly 1316 may be adjusted so that the shoe sole portion 1411 is completely dry before leaving the drying station. After drying, the shoe sole portion 1411 may additionally be transported by the transport assembly 1316 to a quality control checking station where the shoe sole portion 1411 is inspected by either a manual or an automated process.

After being unloaded at the unloading station 1314, the open jig 1410 may be transported by the transport assembly 1316 to a cleaning station where the jig is cleaned by the application of water via, for example, a high-pressure nozzle following by a drying process that may include, for example, a hot air knife. The cleaned jig 1410 is then transported by the transport assembly 1316 back to the loading station where a new unpainted shoe sole portion is loaded into the jig 1410.

Figure 29:
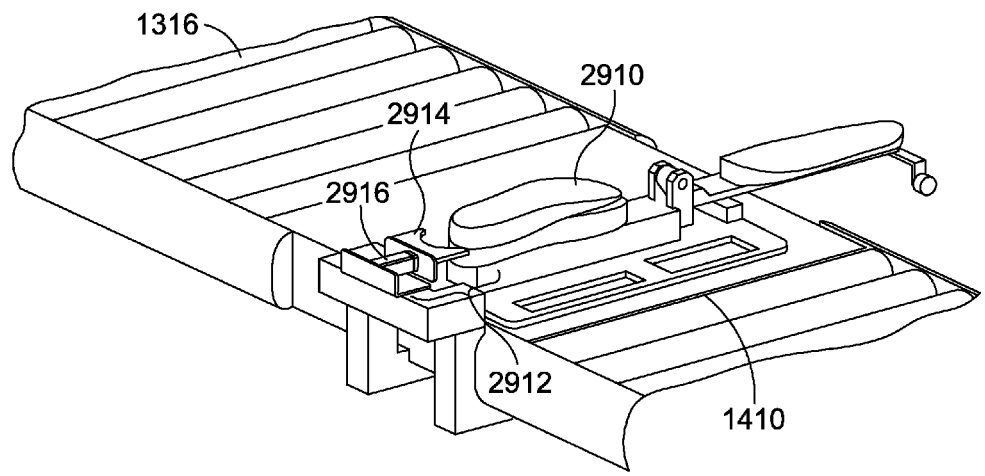
FIG. 29 illustrates an exemplary jig in an open position having an unpainted shoe sole portion positioned on a bottom plate of the jig in accordance with aspects hereof.

FIG. 29 depicts the jig 1410 at one part of a loading station 2900. The jig 1410 is shown in an open position with either an upper or a lower surface of an unpainted shoe sole portion 2910 placed on the bottom plate of the jig 1410. The shoe sole portion 2910 may be manually or automatically placed on the jig 1410. The jig 1410 is oriented with the pivotable connection between the top and bottom plates of the jig 1410 facing away from a seating mechanism 2912, and a heel region of the shoe sole portion 2910 facing towards the seating mechanism 2912. The seating mechanism 2912 is shown in a resting position and may comprise a U-shaped plate 2914 attached to, for example, a positioning arm 2916.

Figure 30:
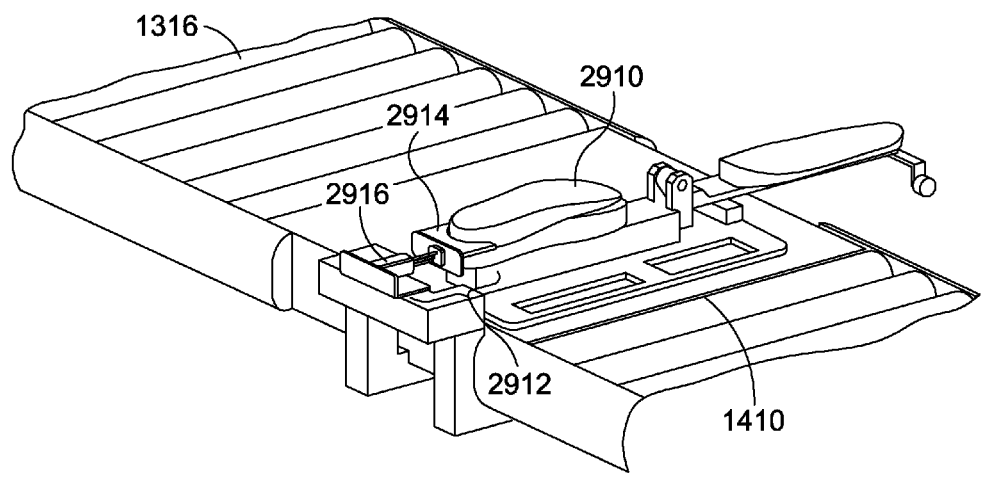
FIG. 30 illustrates an exemplary seating mechanism seating the unpainted shoe sole portion securely on the bottom plate of the jig in accordance with aspects hereof.

One or more sensors associated with the loading station 2900 may sense when the unpainted shoe sole portion 2910 has been positioned on the bottom plate of the jig 1410. At this point, and as shown in FIG. 30, the positioning arm 2916 of the seating mechanism 2912 pushes the U-shaped plate 2914 so that it momentarily contacts the heel region of the shoe sole portion 2910 thus helping to securely seat the shoe sole portion 2910 on the jig 1410. Once the seating mechanism 2912 is back in its resting position, the top plate of the jig 1410 may be pivoted closed by either a manual or by an automated process. The jig 1410 then proceeds to the painting station 1310 as outlined above.

Figure 31:
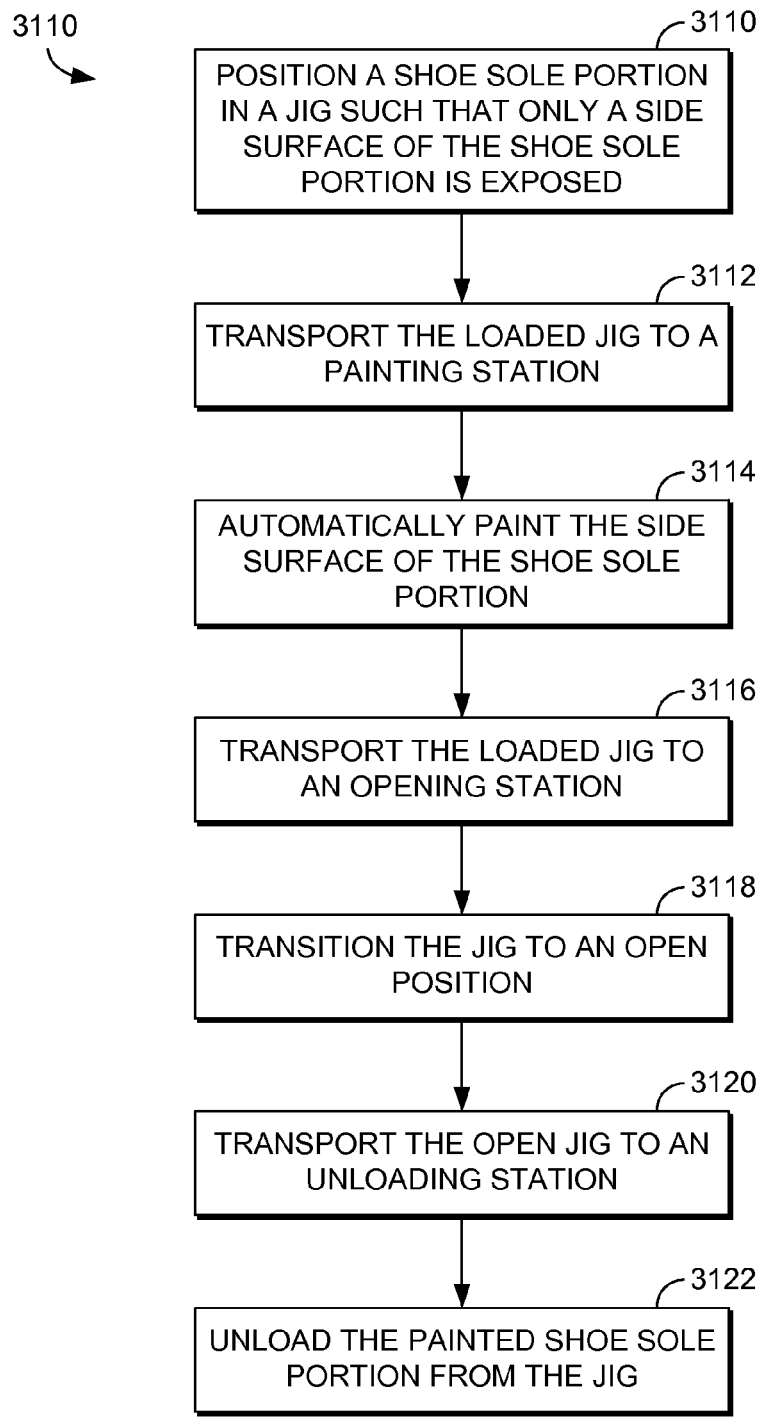
FIG. 31 illustrates a flow diagram of an exemplary method of painting a side surface of a shoe sole portion secured by a jig in accordance with aspects hereof.

Turning now to FIG. 31, a flow diagram is depicted of an exemplary method 3100 of painting a shoe sole portion of a shoe such as the shoe sole portion 1411. At a step 3110, the unpainted shoe sole portion is positioned in a jig, such as the jig 1410, so that only a side surface of the shoe sole portion is exposed. At a step 3112, the loaded jig is transported by a transport assembly, such as the transport assembly 1316 of FIG. 13, to a painting station, such as the painting station 1310 of FIG. 13. At a step 3114, the side surface of the shoe sole portion is automatically painted using, for example, a robotic arm having a painting nozzle such as the 6-axis robot 1416 and the painting nozzle 1414 of FIG. 14.

At a step 3116, the jig containing the painted shoe sole portion is transported by the transport assembly to an opening station such as the opening station 1312 of FIG. 13. At a step 3118, the jig is automatically transitioned to a fully-open position through interaction with, for example, one or more guide plates and a slide rail such as the guide plates 1910 and 1912 and the slide rail 1914 of FIG. 19.

At a step 3120, the open jig containing the painted shoe sole portion is transported to an unloading station such as the unloading station 1314 of FIG. 13. At a step 3122, the painted shoe sole portion is removed from the open jig by interaction with, for example, pick-and-place units such as the first pick-and-place unit 2510 and the second pick-and-place unit 2512 of FIG. 25. The painted shoe sole portion may be subsequently dried, and the jig may be transported to a cleaning station where it is prepared for another unpainted shoe sole portion.

As described above, our technology may comprise, among other things, a method, a system, or a set of instructions stored on one or more computer-readable media. Information stored on the computer-readable media may be used to direct operations of a computing device, such as the exemplary computing device 3200 depicted in FIG. 32. Computing device 3200 is but one example of a suitable computing system and is not intended to suggest any limitation as to the scope of use or functionality of aspects. Neither should the computing system 3200 be interpreted as having any dependency or requirement relating to any one or combination of components illustrated. Moreover, aspects may also be practiced in distributed computing systems where tasks are performed by separate or remote-processing devices that are linked through a communications network.

Figure 32:
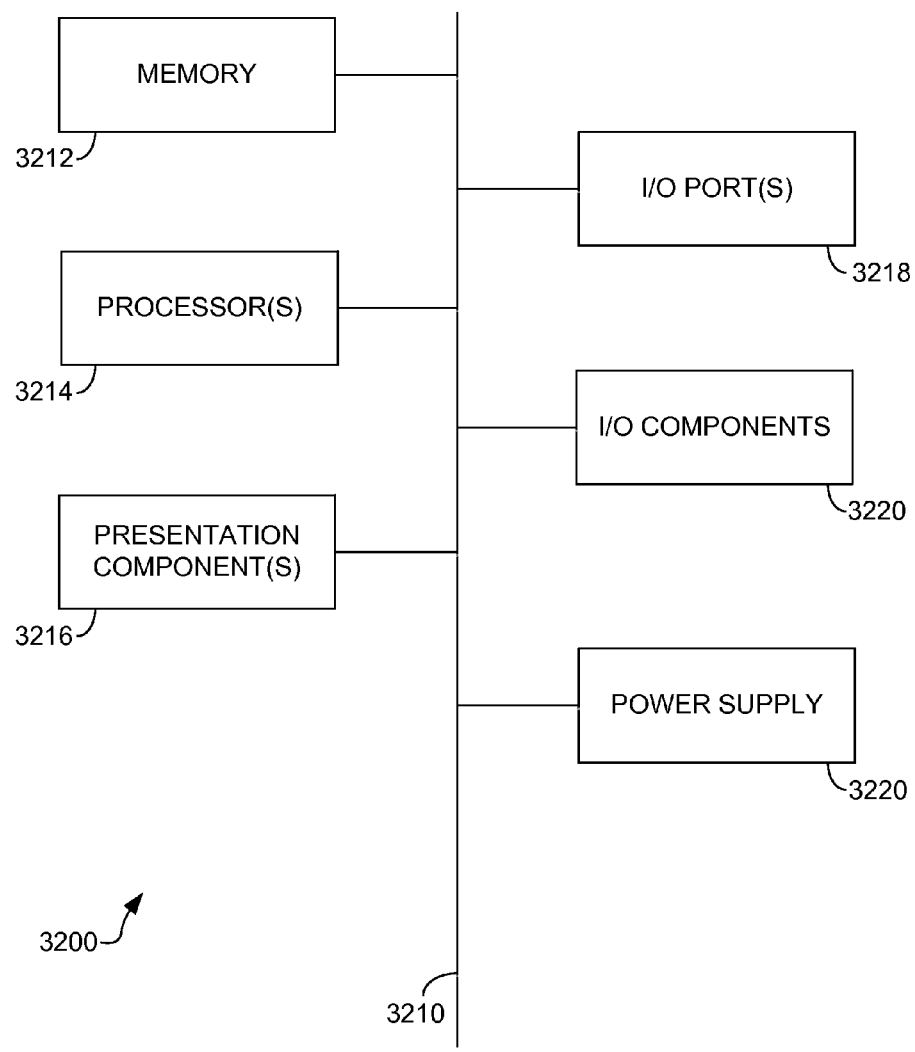
FIG. 32 depicts a block diagram of an exemplary computing device that may be used with a shoe sole portion painting system in accordance with aspects hereof.

Computing device 3200 has a bus 3210 that directly or indirectly couples the following components: memory 3212, one or more processors 3214, one or more presentation components 3216, input/output ports 3218, input/output components 3220, and an illustrative power supply 3222. Bus 3210 represents what may be one or more busses (such as an address bus, data bus, or combination thereof). Although the various blocks of FIG. 32 are shown with lines for the sake of clarity, in reality, delineating various components is not so clear, and metaphorically, the lines would more accurately be grey and fuzzy. For example, processors may have memory.

Computing device 3200 typically may have a variety of non-transitory computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 3200.

Memory 3212 is comprised of tangible computer-storage media in the form of volatile and/or nonvolatile memory. Memory 3212 may be removable, nonremovable, or a combination thereof. Exemplary hardware devices are solid-state memory, hard drives, optical-disc drives, etc.

Computing device 3200 is depicted to have one or more processors 3214 that read data from various entities such as memory 3212 or I/O components 3220. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

Presentation component(s) 3216 present data indications to a user or other device. Exemplary presentation components are a display device, speaker, printing component, light-emitting component, etc. I/O ports 3218 allow computing device 3200 to be logically coupled to other devices including I/O components 3220, some of which may be built in.

In the context of the present aspects, the computing device 3200 may be used to determine operations of various components of the shoe sole portion painting system 1300. For example, a computing device may be used to control the 6-axis robot 1416 and/or the transport assembly 1316 that transfers the jigs and/or shoe sole portions from one location to another. In addition, a computing device may be used to control, among other things, the operations of the first and second pick-and-place units 2510 and 2512, and the seating mechanism 2912.

Many different arrangements of the various components depicted, as well as components not shown, are possible without departing from the scope of the claims below. Aspects of our technology have been described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A painting system for painting a shoe sole portion of a shoe, the painting system comprising:
   a loading station adapted to position the shoe sole portion in a jig comprising a bottom plate having a first multi-layer deforming layer and a first rigid layer and a top plate pivotably coupled to the bottom plate, the top plate having a second multi-layer deforming layer and a second rigid layer, wherein the top plate and the bottom plate are placed in a closed position at the loading station such that an upper surface and a lower surface of the shoe sole portion are completely covered by the top plate and the bottom plate of the jig when the jig is in the closed position, and at least a portion of a side surface of the shoe sole portion is left exposed when the jig is in the closed position;
   a computer-controlled painting station adapted to automatically paint the exposed portion of the side surface of the shoe sole portion while the shoe sole portion is positioned in the jig; and
   a transport assembly adapted to transport the closed jig from the loading station to the painting station.

2. The painting system of claim 1, wherein the first multi-layer deforming layer of the bottom plate of the jig is adapted to receive the upper surface of the shoe sole portion.

3. The painting system of claim 1, wherein the second multi-layer deforming layer of the top plate of the jig is adapted to cover the lower surface of the shoe sole portion.

4. The painting system of claim 3, wherein the first and second multi-layer deforming layers are constructed using cast polyurethane, and wherein the cast polyurethane is deformable.

5. The painting system of claim 4, wherein the first and second rigid layers are constructed from metal.

6. The painting system of claim 1, wherein the jig further comprises an open-assist mechanism affixed to the second rigid layer of the top plate, wherein the open-assist mechanism is adapted to transition the jig from the closed position to an at least partially open position.

7. The painting system of claim 6, wherein the open-assist mechanism comprises a first member and a second member, wherein the first member extends beyond a lateral side of the second rigid layer of the top plate and the second member extends beyond a medial side of the second rigid layer of the top plate.

8. A painting system for painting a shoe sole portion of a shoe, the painting system comprising:
   a loading station adapted to position the shoe sole portion in a jig in a closed position, the jig adapted to hold the shoe sole portion in a fixed position when the jig is in the closed position such that only a side surface of the shoe sole portion is exposed;
   a painting station adapted to paint the exposed side surface of the shoe sole portion while being held by the jig, wherein the painting station is controlled by a computing device having a predefined painting path associated with the jig;
   an opening station having an opening mechanism adapted to translate movement of the jig into an opening force that transitions the jig from the closed position to an open position; and
   a transport assembly adapted to transport the jig from the loading station to the painting station, and from the painting station to the opening station.

9. The painting system of claim 8, wherein the transport assembly comprises a roller conveyor assembly.

10. The painting system of claim 9, wherein the painting station and the opening station are movable relative to one another.

11. A painting system for painting a shoe sole portion of a shoe, the painting system comprising:
    a loading station adapted to position the shoe sole portion in a jig in a closed position, the jig configured to hold the shoe sole portion in an inverted position such that when the jig is in the closed position, only a side surface of the shoe sole portion is exposed;

a computer controlled painting station that is adapted to paint the exposed side surface of the shoe sole portion while being maintained by the jig;

an opening station having an opening mechanism adapted to transition the jig from the closed position to a fully-open position;

an unloading station having an inversion mechanism that is adapted to remove the shoe sole portion from the jig and invert the shoe sole portion to an upright position; and a transport assembly adapted to transport the jig from a first location to the painting station, from the painting station to the opening station, and from the opening station to the unloading station.

12. The painting system of claim 11, wherein the jig comprises at least a bottom plate, a top plate pivotably coupled to the bottom plate, and an open-assist mechanism affixed to the top plate of the jig, wherein the open-assist mechanism comprises:

a first vertical portion;

a second vertical portion; and a horizontal portion connecting the first vertical portion and the second vertical portion, wherein the horizontal portion is affixed to the top plate of the jig and the first and second vertical portions extend vertically away from the top plate of the jig.

13. The painting system of claim 12, wherein the opening mechanism at the opening station comprises at least:

a first guide plate having:
(A) a first portion adapted to effectively engage the first vertical portion of the open-assist mechanism of the jig when the jig is in the closed position,
(B) a second portion adapted to transition the top plate of the jig via the pivotable connection from the closed position to a partially-open position, and
(C) a third portion adapted to release the first vertical portion of the open-assist mechanism when the top plate of the jig is in the partially-open position; and a second guide plate having:
(A) a first portion adapted to effectively engage the second vertical portion of the open-assist mechanism of the jig when the jig is in the closed position,
(B) a second portion adapted to transition the jig via the pivotable connection from the closed position to the partially-open position, and
(C) a third portion adapted to release the second vertical portion of the jig when the jig is in the partially-open position, wherein the first and second plates together assist in transitioning the jig from the closed position to the partially-open position.

14. The painting system of claim 13, further comprising a slide rail that assists in transitioning the jig from the partially-open position to the fully-open position, wherein the first guide plate is in a first plane and the second guide plate is in a second, substantially parallel plane, and wherein the slide rail is oriented in a direction perpendicular to the first plane and the second plane.

15. The painting system of claim 14, wherein the slide rail comprises a first substantially horizontal portion and a second slanted-angle portion that angles in a downward direction.

16. The painting system of claim 15, wherein the first substantially horizontal portion of the slide rail is operatively coupled to at least the second guide plate.

17. The painting system of claim 16, wherein the first substantially horizontal portion of the slide rail is adapted to receive the top plate of the jig after being released from the first and second guide plates.

18. The painting system of claim 17, wherein the second slanted-angle portion of the slide rail is configured to transition the jig from the partially-open position to the fully-open position.

\* \* \* \* \*